United States Patent
Huang et al.

(10) Patent No.: US 12,422,626 B2
(45) Date of Patent: Sep. 23, 2025

(54) ADAPTER ASSEMBLY AND OPTICAL COMMUNICATIONS DEVICE

(71) Applicant: Huawei Technologies Co., Ltd., Shenzhen (CN)

(72) Inventors: Huoqing Huang, Dongguan (CN); Bo Yan, Shenzhen (CN); Anxue Du, Dongguan (CN); Baoshan Zhuang, Xi'an (CN); Xinhua Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 17/849,362

(22) Filed: Jun. 24, 2022

(65) Prior Publication Data

US 2022/0413227 A1    Dec. 29, 2022

(30) Foreign Application Priority Data

Jun. 25, 2021    (CN) .......................... 202110711750.X

(51) Int. Cl.
*G02B 6/36* (2006.01)
*G02B 6/38* (2006.01)

(52) U.S. Cl.
CPC ......... *G02B 6/3825* (2013.01); *G02B 6/3885* (2013.01); *G02B 6/3893* (2013.01); *G02B 6/3897* (2013.01)

(58) Field of Classification Search
CPC .. G02B 6/3825; G02B 6/3885; G02B 6/3893; G02B 6/3897; G02B 6/4452; G02B 6/36
See application file for complete search history.

(56) References Cited

U.S. PATENT DOCUMENTS

| | | | |
|---|---|---|---|
| 6,419,399 B1* | 7/2002 | Loder | G02B 6/3869 385/53 |
| 6,568,861 B2 | 5/2003 | Benner et al. | |
| 7,296,935 B1 | 11/2007 | Childers et al. | |
| 10,107,972 B1* | 10/2018 | Gniadek | G02B 6/3825 |
| 2003/0165298 A1 | 9/2003 | Ngo | |
| 2005/0281509 A1 | 12/2005 | Cox et al. | |
| 2009/0175007 A1 | 7/2009 | Joist et al. | |
| 2017/0265338 A1 | 9/2017 | Kim et al. | |
| 2021/0066853 A1 | 3/2021 | Miller et al. | |

FOREIGN PATENT DOCUMENTS

CN    106896451 A    6/2017

\* cited by examiner

*Primary Examiner* — Jennifer Doan
(74) *Attorney, Agent, or Firm* — Leydig, Voit & Mayer, Ltd.

(57) ABSTRACT

This application discloses an adapter assembly and an optical communications device, and belongs to the field of connector technologies. The adapter assembly is configured to be installed on a hole of a panel, and the adapter assembly includes: a mechanical transmission (MT) to multi-fiber push on (MPO) adapter (MT/MPO adapter), where the MT/MPO adapter includes a flange plate, an MT port, and an MPO port, the MT port and the MPO port are respectively located on two sides of the flange plate in a thickness direction, and the MPO port is configured to be connected to an MPO plug; and an MT plug, where the MT plug includes an MT optical fiber and an MT clamp that are connected, and the MT plug is connected to the MT port. The flange plate is made of conductive plastic. This application can shield an electromagnetic wave in the optical communications device.

17 Claims, 13 Drawing Sheets

ADAPTER ASSEMBLY AND OPTICAL COMMUNICATIONS DEVICE

CROSS-REFERENCE TO RELATED APPLICATIONS

This application claims priority to Chinese Patent Application No. 202110711750.X, filed on Jun. 25, 2021, which is incorporated herein by reference in its entirety.

TECHNICAL FIELD

This application relates to the field of connector technologies, and in particular, to an adapter assembly and an optical communications device.

BACKGROUND

An adapter assembly is important in an optical communications device. The adapter assembly includes a mechanical transmission (MT), also referred to as mechanical mating transmission, to multi-fiber push on (MPO) adapter (MT/MPO adapter) and an MT plug. Two ends of the MT/MPO adapter are respectively an MT port and an MPO port. The MT port is configured to be connected to the MT plug, and the MPO port is configured to be connected to an MPO plug. The MT plug includes an MT optical fiber and an MT clamp. The MT optical fiber is connected to the MT port by using the MT clamp.

To reduce costs, in a current adapter assembly, an MT/MPO adapter is made of plastic, and the plastic MT/MPO adapter cannot shield an electromagnetic wave in an optical communications device. Consequently, a security risk is caused.

SUMMARY

Embodiments of this application provide an adapter assembly and an optical communications device. Technical solutions are as follows:

According to a first aspect, an adapter assembly is provided. The adapter assembly is configured to be installed on a hole of a panel, and the adapter assembly includes: an MT/MPO adapter, where the MT/MPO adapter includes a flange plate, an MT port, and an MPO port, the MT port and the MPO port are respectively located on two sides of the flange plate in a thickness direction, and the MPO port is configured to be connected to an MPO plug; and an MT plug, where the MT plug includes an MT optical fiber and an MT clamp that are connected, and the MT plug is connected to the MT port. The flange plate is made of conductive plastic.

In the adapter assembly provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Optionally, another part of the MT/MPO adapter in addition to the flange plate may also be made of conductive plastic.

For example, the MT port is made of conductive plastic, so that electromagnetic shielding by the adapter assembly is further improved. In addition, because the conductive plastic is elastic, abrasion to the MT port can be reduced. Especially, when the MT plug is connected to the MT port in a pluggable manner, abrasion to the MT plug and the MT port caused by insertion and removal can be effectively reduced, so that a lifespan of the adapter assembly is prolonged.

For another example, the MPO port is made of conductive plastic, so that electromagnetic shielding by the adapter assembly is further improved. In addition, because the conductive plastic is elastic, abrasion to the MPO port can be reduced, and especially abrasion to the MPO plug and the MPO port caused by insertion and removal can be reduced, so that lifespans of the adapter assembly and the MPO plug are prolonged.

In this embodiment of this application, the flange plate, the MT port, and the MPO port may be made of same conductive plastic through integral molding. This facilitates manufacturing, and can also implement electromagnetic wave shielding by the entire MT/MPO adapter. For example, the MT/MPO adapter may be manufactured by performing a mould opening process.

For example, a material of the conductive plastic includes any one or more of the following: polyethersulfone, polyaniline, polyacetylene, and polyphenylene vinylene. For example, polyethersulfone is PESU-CF30, and a conductivity of PESU-CF30 may be 50 Siemens per meter (S/m).

Optionally, at least a part of the MT clamp is made of conductive plastic.

In an optional example, the MT plug is detachably connected to the MT port.

For example, the MT optical fiber includes an optical fiber head and a pigtail, and the MT clamp includes a holder and a guide rod. A first end of the guide rod is fixedly connected to the holder, a second end of the guide rod is configured to be inserted into a guide hole of the optical fiber head from one end that is of the guide hole and that is close to the pigtail and be exposed from one end that is of the guide hole and that is far away from the pigtail, and the first end and the second end of the guide rod are two opposite ends of the guide rod. The holder has an accommodating part. The accommodating part is configured to allow the pigtail of the MT optical fiber to pass through after the guide rod is inserted into the guide hole. The holder is made of conductive plastic.

In this embodiment of this application, because the holder is made of conductive plastic, after the MT plug is connected to the MT port, the MT plug blocks most holes of the MT port by using the holder, so that electromagnetic shielding by the adapter assembly is further improved. In addition, because the conductive plastic is elastic, abrasion to the holder can be reduced. Especially, when the MT plug is detachably connected to the MT port, abrasion to the holder and the MT port caused by insertion and removal can be reduced, so that a lifespan of the adapter assembly is prolonged.

For example, the accommodating part includes a groove, and a maximum size of an opening of the groove for the pigtail to pass through is less than or equal to 3.5 millimeters. An area of the opening is 3.25*1.95 square millimeters. Because the area of the opening of the groove is greatly reduced compared with an area of a hole of the MT port, after the MT plug is connected to the MT port, the MT plug blocks most holes of the MT port by using the holder, and only a small amount of electromagnetic wave leakage occurs in an opening region of the groove. Therefore, compared with a conventional adapter assembly, this effectively improves an electromagnetic wave shielding effect.

In an optional example, the accommodating part further includes a cover that is detachably connected to the groove. Because both the groove and the cover are made of conductive plastic, after the groove and the cover are connected, smaller space may be formed for the pigtail to pass through, and a region in which an electromagnetic wave passes through is further reduced, so that an electromagnetic wave shielding effect is effectively improved. In addition, because the conductive plastic is elastic, the groove and the cover may be tightly clamped through an interference fit.

Optionally, two ends of the flange plate in a length direction each have a first fixing hole, and the flange plate is configured to be installed on the hole of the panel through the first fixing hole. Optionally, the first fixing hole is a threaded hole having an internal thread, or the first fixing hole is not a threaded hole. The flange plate may be installed on the hole of the panel by using an external-thread screw to pass through the first fixing hole and a second fixing hole of the panel. This implements an effective connection between a screw and a threaded hole, thereby implementing effectively fixing between the flange plate and the panel.

For example, the panel has a locating hole, the flange plate has a guide pin, and the guide pin is configured to be inserted into the locating hole of the panel. Disposing the guide pin can prevent the MT/MPO adapter from being reversely installed, and ensure that the MT/MPO adapter is stably and correctly connected to the hole.

According to a second aspect, an optical communications device is provided. The optical communications device includes:

a panel, where the panel has a hole; and the adapter assembly according to the first aspect, where an MT/MPO adapter in the adapter assembly is installed on the hole.

Optionally, the optical communications device further includes two mechanical parts. The two mechanical parts are fixed to two sides of the hole of the panel in a length direction of the hole; and two ends of a flange plate are respectively fixed to the two mechanical parts to be installed on the hole of the panel. For example, the mechanical part may be a metal part, and may be made of aluminum alloy or steel. The mechanical part may be riveted to the panel.

The MT/MPO adapter is not directly connected to the panel, but is indirectly connected to the panel by using the mechanical part. When providing a basis for fixedly assembling the MT/MPO adapter, the mechanical part can reduce damage to the panel, and enhance strength of the panel. In addition, because the strength of the panel is improved, deformation of the panel caused by an excessively large hole of the panel can be prevented.

In an optional example, the optical communications device further includes a screw. Each mechanical part has a second fixing hole; the two ends of the flange plate in a length direction each have a first fixing hole; and each of the two ends of the flange plate is fixed to the mechanical part by using a screw that passes through the first fixing hole and the second fixing hole.

Optionally, at least one of the first fixing hole and the second fixing hole is a threaded hole having an internal thread, and the screw has an external thread. This implements an effective connection between a screw and a threaded hole, thereby implementing effectively fixing between the flange plate and the mechanical part. For example, the first fixing hole is a non-threaded hole, and the second fixing hole is a threaded hole.

For example, the mechanical part includes a strip-shaped reinforcing rib. In a first optional example, the strip-shaped reinforcing rib is relatively wide. For example, a width of the strip-shaped reinforcing rib is a first width in which the second fixing hole can be disposed. In a second optional manner, the strip-shaped reinforcing rib is relatively narrow. For example, a width of the strip-shaped reinforcing rib is a second width, and the second width is less than the first width. The mechanical part further includes a block-shaped reinforcing rib, and the block-shaped reinforcing rib is located at one end of the strip-shaped reinforcing rib and is fixedly connected to the strip-shaped reinforcing rib. The block-shaped reinforcing rib is configured to dispose the second fixing hole. Compared with the first example, the second example has a smaller area of the mechanical part, and correspondingly uses fewer materials, thereby reducing costs.

Optionally, the panel has a locating hole, the flange plate has a guide pin, and the guide pin is configured to be inserted into the locating hole of the panel. Disposing the guide pin and the locating hole can prevent the MT/MPO adapter from being reversely installed, and ensure that the MT/MPO adapter is stably and correctly connected to the hole.

In an optional manner, the optical communications device further includes a shielding gasket. The shielding gasket is located between the MT/MPO adapter and the panel. Disposing the shielding gasket can implement effective sealing and reliable contact between the MT/MPO adapter and the panel, thereby better preventing electromagnetic leakage.

For example, the shielding gasket is a flexible conductive gasket. Because the flexible conductive gasket is elastic, abrasion to the MT/MPO adapter and the panel can be reduced, so that lifespans of the MT/MPO adapter and the panel are prolonged.

According to a third aspect, an embodiment of this application further provides an optical communications system. The optical communications system includes one or more optical communications devices provided in the second aspect. The optical communications device may be a high-speed high-frequency board such as a router or a switch.

In the adapter assembly provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Moreover, after all MT ports of the MT/MPO adapter are connected to an MT clamp with an opening area of 3.25*1.95 square millimeters, each adapter assembly can implement at least 10 dB shielding for an electromagnetic wave whose frequency range is from 0 GHz to 35 GHz. In this way, even if a plurality of adapter assemblies are installed on one panel, electromagnetic wave shielding can be effectively implemented. Therefore, the optical communications device provided in this embodiment of this application supports installation of a plurality of adapter assemblies, to implement multi-fiber coiling of the panel and implement a high bandwidth of the panel. For example, one board may provide 4 to 8 MPO ports.

DESCRIPTION OF EMBODIMENTS

To make principles and technical solutions of this application clearer, the following further describes implementations of this application in detail with reference to the accompanying drawings.

Figure 1:
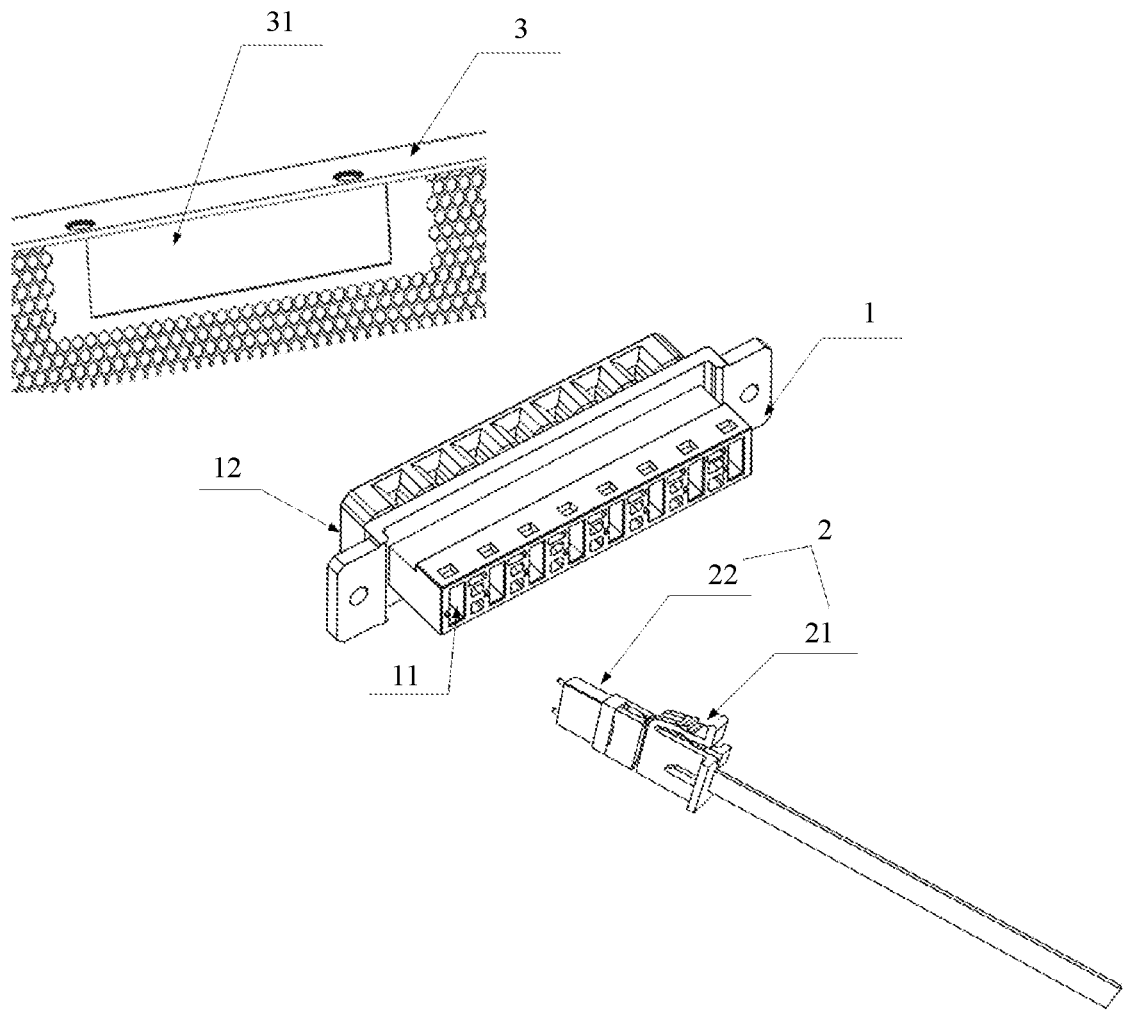
FIG. 1 is a schematic diagram of an application environment of an adapter assembly according to an embodiment of this application.

FIG. 1 is a schematic diagram of an application environment of an adapter assembly according to an embodiment of this application. The application environment includes: an MT/MPO adapter 1, an MT plug 2, and a panel 3. The MT/MPO adapter 1 is installed on a hole 31 of the panel 3 in an optical communications device. For example, the optical communications device may be a high-speed high-frequency board such as a router board or a switch board. The optical communications device may support communication by using co-packaged on-board optics, and the optical communications device supports on-board fiber coiling to the MT/MPO adapter. Two sides of each MT/MPO adapter 1 in a thickness direction respectively have an MT port 11 and an MPO port 12. The MT port 11 is configured to be connected to the MT plug 2, and the MPO port 12 is configured to be connected to an MPO plug (not shown in the figure). The MT plug 2 includes an MT clamp 21 and an MT optical fiber 22 that are connected. The MT clamp 21 is sheathed outside the MT optical fiber 22, and an external shape of the MT clamp 21 and an internal shape of the MT port 11 match (for example, are consistent or partially consistent), so that the MT plug 2 is effectively inserted into the MT port 11.

The adapter assembly includes the MT/MPO adapter 1 and the MT plug 2 that may be fixedly or detachably connected.

To reduce costs, in a current adapter assembly, an MT/MPO adapter is made of plastic, and the plastic MT/MPO adapter cannot shield an electromagnetic wave in an optical communications device. Consequently, a security risk is caused.

Figure 2:
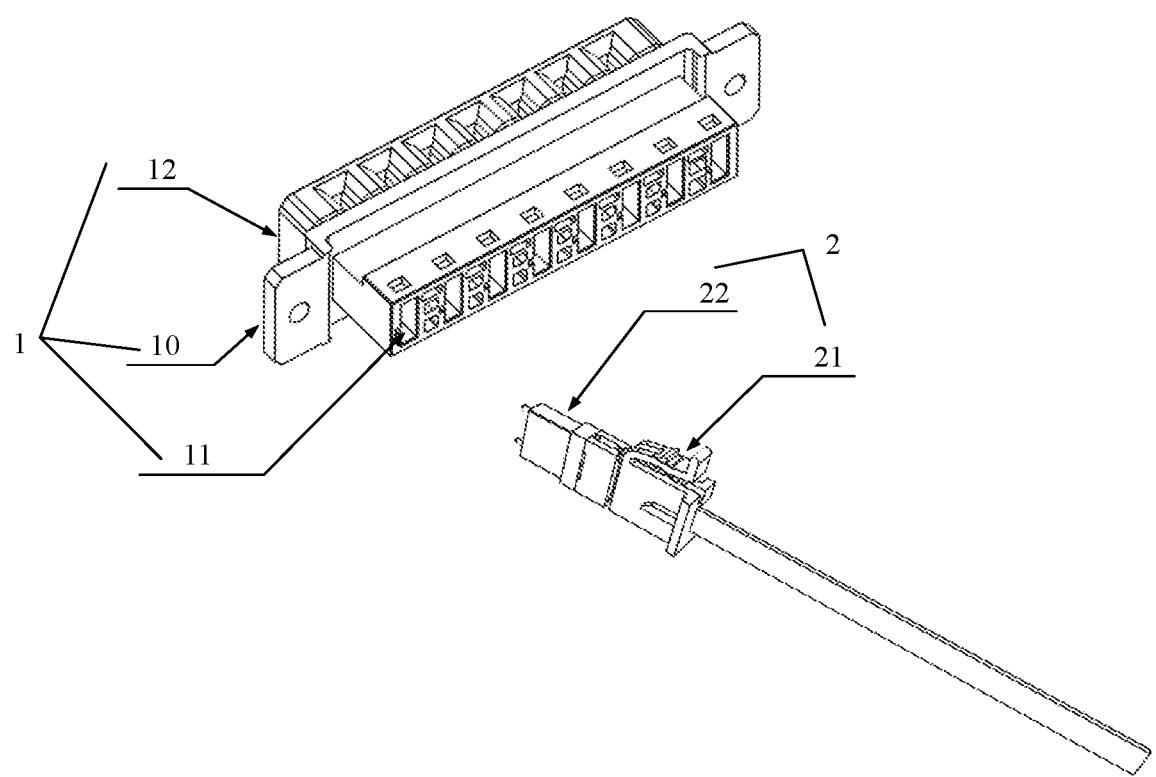
FIG. 2 is a schematic diagram of a structure of an adapter assembly according to an embodiment of this application.

FIG. 2 is a schematic diagram of a structure of an adapter assembly according to an embodiment of this application. The adapter assembly can resolve the foregoing problem. The adapter assembly is configured to be installed on a hole of a panel. As shown in FIG. 2, the adapter assembly includes:

an MT/MPO adapter 1, where the MT/MPO adapter 1 includes a flange plate 10, an MT port 11, and an MPO port 12, the MT port 11 and the MPO port 12 are respectively located on two sides of the flange plate in a thickness direction, and the MPO port is configured to be connected to an MPO plug; and an MT plug 2, where the MT plug includes an MT clamp 21 and an MT optical fiber 22 that are connected, and the MT plug 2 is connected to the MT port 11, for example, in a fixed or pluggable manner.

The flange plate 10 is made of conductive plastic. Optionally, the MT port 11 or the MPO port 12 of the MT/MPO adapter may be made of plastic, thereby reducing manufacturing costs.

In the adapter assembly provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Figure 3:
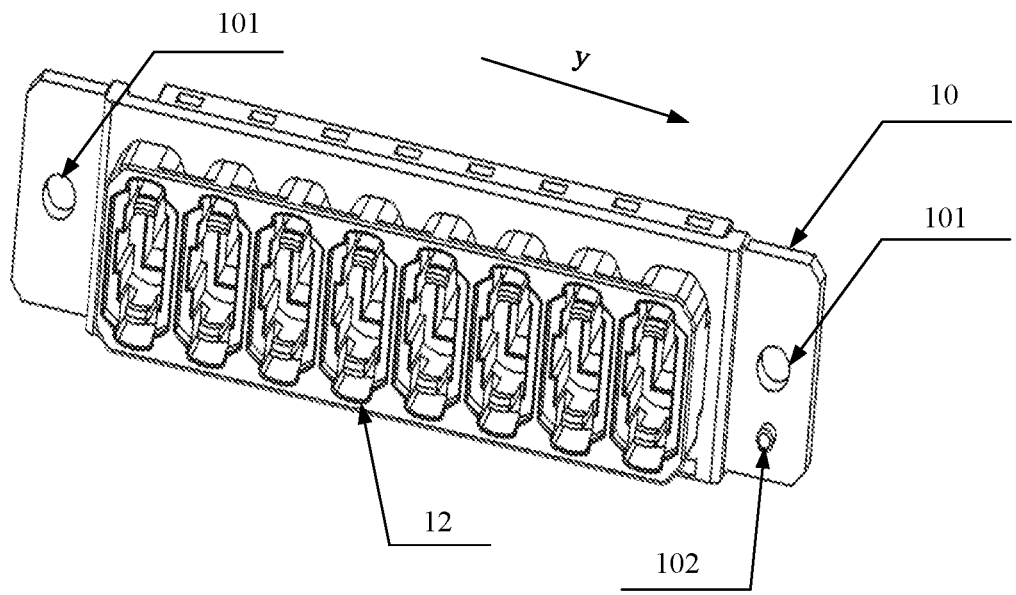
FIG. 3 is a schematic diagram of a structure of an MT/MPO adapter according to an embodiment of this application.

FIG. 3 is a schematic diagram of a structure of the MT/MPO adapter 1 according to an embodiment of this application. In FIG. 3, two ends of the flange plate 10 in a length direction y each have a first fixing hole 101, and the flange plate 10 is configured to be installed on the hole 31 of the panel 3 through the first fixing hole 101. Optionally, the first fixing hole 101 is a threaded hole having an internal thread, or the first fixing hole 301 is not a threaded hole. The flange plate 10 may be installed on the hole 31 of the panel 3 by using an external-thread screw to pass through the first fixing hole and a second fixing hole of the panel. This implements an effective connection between a screw and a threaded hole, thereby implementing effectively fixing between the flange plate 10 and the panel 3.

In an optional example, the panel 3 has a locating hole. Correspondingly, as shown in FIG. 3, the flange plate 10 has a guide pin 102, and the guide pin 102 is configured to be inserted into the locating hole of the panel 3. For example, the guide pin 102 is disposed on a side on which the MPO port 12 of the flange plate 10 is located. When the MT/MPO adapter is installed on the panel, the MPO port 12 of the MT/MPO adapter is inserted into the hole from one side of the hole (also referred to as an inner side of the panel), the guide pin 102 is inserted into the locating hole of the panel 3, and then the MPO port 12 is exposed from the other side of the hole (also referred to as an outer side of the panel).

Disposing the guide pin 102 can prevent the MT/MPO adapter from being reversely installed, and ensure that the MT/MPO adapter is stably and correctly connected to the hole.

Optionally, another part of the MT/MPO adapter 1 in addition to the flange plate may be made of plastic or conductive plastic.

For example, the MT port 11 is made of conductive plastic, so that electromagnetic shielding by the adapter assembly is further improved. In addition, because the conductive plastic is elastic, abrasion to the MT port can be reduced. Especially, when the MT plug is connected to the MT port in a pluggable manner, abrasion to the MT plug and the MT port caused by insertion and removal can be effectively reduced, so that a lifespan of the adapter assembly is prolonged.

For another example, the MPO port 12 is made of conductive plastic, so that electromagnetic shielding by the adapter assembly is further improved. In addition, because the conductive plastic is elastic, abrasion to the MPO port can be reduced, and especially abrasion to the MPO plug and the MPO port caused by insertion and removal can be reduced, so that lifespans of the adapter assembly and the MPO plug are prolonged.

In this embodiment of this application, materials of the flange plate 10, the MT port 11, and the MPO port 12 may be the same or may be different. The flange plate, the MT port, and the MPO port may be made of same conductive plastic through integral molding. This facilitates manufacturing, and can also implement electromagnetic wave shielding by the entire MT/MPO adapter. For example, the MT/MPO adapter 1 may be manufactured by performing a mould opening process.

For example, a material of the conductive plastic includes any one or more of the following: polyethersulfone (PESU), polyaniline (PAn), poly acetylene (Pa), and polyphenylene vinylene (PPv). For example, polyethersulfone is PESU-CF30, and a conductivity of PESU-CF30 may be 50 Siemens per meter (S/m).

Figure 4:
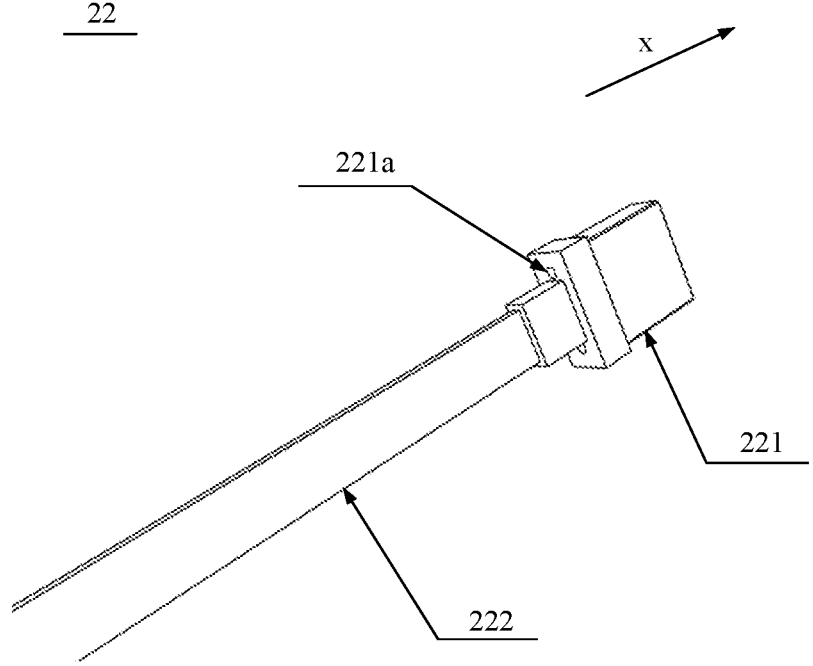
FIG. 4 is a schematic diagram of a structure of an MT optical fiber according to an embodiment of this application.

Optionally, at least a part of the MT clamp 21 is made of conductive plastic. To clearly describe the MT clamp 21, the following first briefly describes the MT optical fiber 22. FIG. 4 is a schematic diagram of a structure of the MT optical fiber 22 according to an embodiment of this application. The MT optical fiber 22 includes an optical fiber head 221 and a pigtail 222 that are connected, and the optical fiber head 221 has a guide hole 221a.

Figure 5:
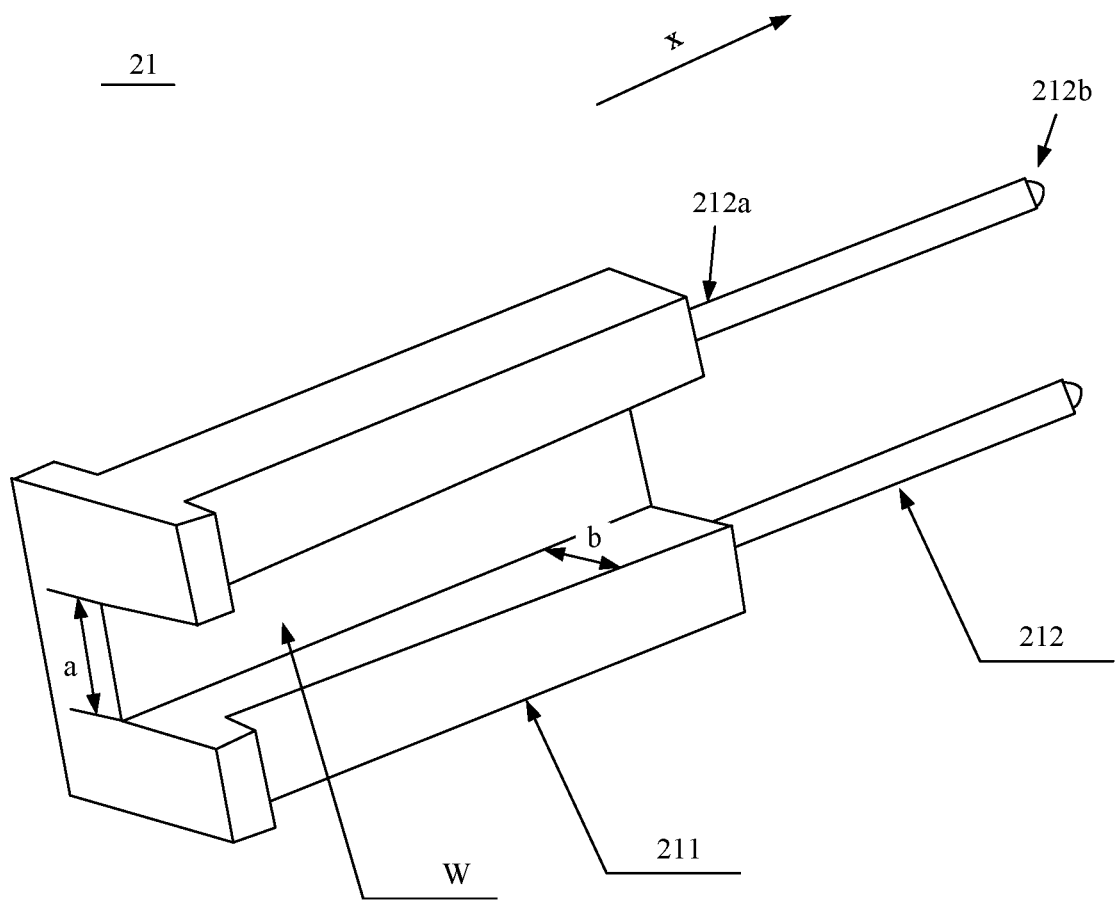
FIG. 5 is a schematic diagram of a structure of an MT clamp according to an embodiment of this application.

The MT plug may be connected to the MT port through fixing or in a pluggable manner. FIG. 5 is a schematic diagram of a structure of the MT clamp 21 according to an embodiment of this application. The MT clamp 21 may support a pluggable connection between the MT plug and the MT port. The MT clamp 21 includes a holder 211 and a guide rod 212.

A first end 212a of the guide rod 212 is fixedly connected to the holder 211. A second end 212b of the guide rod 212 is configured to be inserted into the guide hole 221a of the optical fiber head 221 from one end that is of the guide hole 221a and that is close to the pigtail and be exposed from one end that is of the guide hole 221a and that is far away from the pigtail. In other words, the guide rod 212 is inserted into the guide hole 221a in a target direction x in FIG. 4 or FIG. 5, and the target direction x is parallel to an extension direction of the guide hole. The first end 212a and the second end 212b of the guide rod 212 are two opposite ends of the guide rod 212.

In this embodiment of this application, a quantity of guide rods 212 matches a quantity of guide holes 221a. For example, the quantity of guide rods 212 is equal to the quantity of guide holes 221a. The optical fiber head 221 usually has two guide holes 221a. Therefore, the MT clamp 21 usually includes two guide rods 212.

The holder 211 has an accommodating part W. The accommodating part W is configured to allow the pigtail 222 of the MT optical fiber 22 to pass through after the guide rod 212 is inserted into the guide hole 221a.

The holder 211 is made of conductive plastic.

The MT port of the MT/MPO adapter has a hole that is connected to the MT plug. A conventional MT clamp is usually made of plastic, and cannot shield an electromagnetic wave. Consequently, an electromagnetic wave in an optical communications device leaks from the open hole.

In this embodiment of this application, the holder 211 is made of conductive plastic. Therefore, after the MT plug is connected to the MT port, the MT plug blocks most holes of the MT port by using the holder, so that electromagnetic shielding by the adapter assembly is further improved. In addition, because the conductive plastic is elastic, abrasion to the holder 211 can be reduced. Especially, when the MT plug is detachably connected to the MT port, abrasion to the holder 211 and the MT port caused by insertion and removal can be reduced, so that a lifespan of the adapter assembly is prolonged.

For example, as shown in FIG. 5, the accommodating part W may include a groove. An extension direction of the groove is parallel to an extension direction of the guide rod 212. After the guide rod is inserted into the guide hole, the extension direction of the groove is parallel to a direction (namely, the target direction x) in which the guide rod is inserted into the guide rod. The groove may help the pigtail 222 pass through, thereby implementing quick assembling of the MT clamp and the MT optical fiber.

Optionally, a maximum size of an opening of the groove for the pigtail 222 to pass through is less than or equal to 3.5 millimeters. A flat surface on which the opening is located is perpendicular to the extension direction of the groove. The maximum size of the opening is a maximum value in a depth and a width of the groove. Therefore, both the depth and the width of the groove are less than or equal to 3.5 millimeters. For example, if a width a of the opening is 3.25 millimeters, and a depth b of the opening is 1.95 millimeters, an area of the opening is 3.25*1.95 square millimeters.

Figure 6:
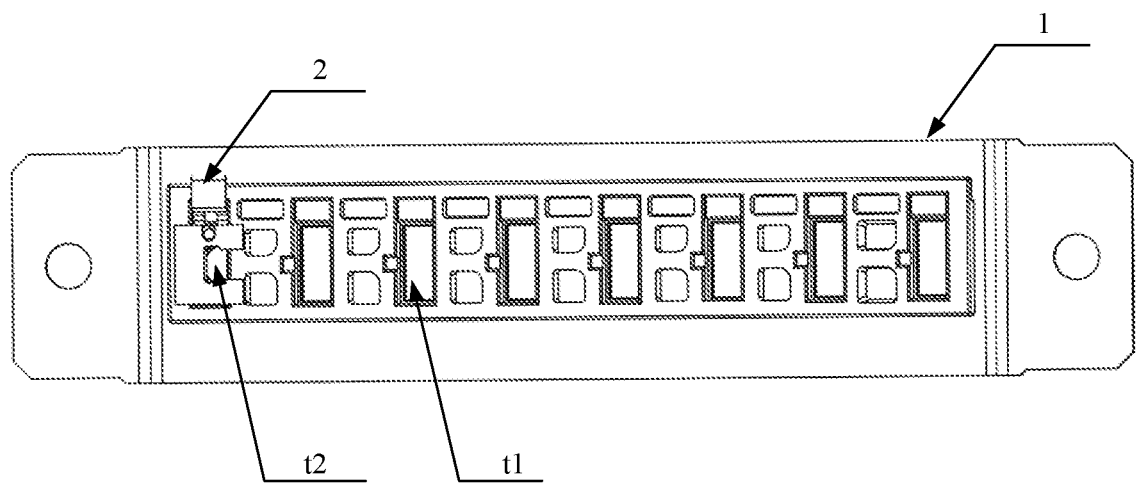
FIG. 6 is a schematic diagram of a structure of an adapter assembly according to an embodiment of this application.

FIG. 6 is a schematic diagram of a structure of an adapter assembly according to an embodiment of this application. In FIG. 6, it is assumed that an MT plug 2 is inserted into an MT port of one MT/MPO adapter 1 in the adapter assembly, and no MT plug is inserted into another MT port. In addition, for ease of viewing, an optical fiber in the MT plug 2 in FIG. 6 is removed. In this case, as shown in FIG. 6, an area of an opening t2 of a groove of an MT clamp is far less than an area of a hole t1 of the MT port. When the MT plug 2 is inserted into the MT port, a region in which an electromagnetic wave may leak is reduced to a region in which the opening t2 is located. Therefore, electromagnetic wave leakage is effectively reduced. For example, the area of the hole t1 that is connected to the MT plug at the MT port of the MT/MPO adapter is usually 6.55*3.55 square millimeters. When the area of the opening t2 is 3.25*1.95 square millimeters, an area of the region in which an electromagnetic wave may leak is reduced by (6.55*3.55−3.25*1.95) square millimeters.

It can be learned that the area of the opening of the groove is greatly reduced compared with the area of the hole of the MT port. Therefore, after the MT plug is connected to the MT port, the MT plug blocks most holes of the MT port by using a holder, and only a small amount of electromagnetic wave leakage occurs in the opening region of the groove. Therefore, compared with a conventional adapter assembly, this effectively improves an electromagnetic wave shielding effect. For example, after all MT ports of the MT/MPO adapter are connected to the MT clamp whose opening area is 3.25*1.95 square millimeters, performing simulation and actual measurement on a size of the opening can prevent an electromagnetic wave from leaking outside a panel, thereby implementing at least 10 dB (decibel) shielding for an electromagnetic wave in a frequency range from 0 GHz to 35 GHz (gigahertz) (in other words, reducing at least 10 dB electromagnetic wave radiation), reducing an electromagnetic radiation and leakage in a high-speed high-frequency board, and complying with an electro magnetic compatibility (EMC) access specification.

In addition, the MT clamp provided in this embodiment of this application has a relatively simple structure, and occupies relatively small space. This can implement overall miniaturization of the MT plug, and facilitate insertion and removal.

In FIG. 5, an example in which the holder 211 is of an integrated structure is used for description. During actual implementation in this embodiment of this application, the holder 211 may alternatively be of another structure. For example, the holder may be of a detachable structure. The detachable structure of the holder can implement miniaturization of each component of the holder, and implement replacement of each component. When a component is abraded or the like, the component may be replaced, so that a lifespan of the holder is prolonged, and maintenance costs are reduced.

Figure 7:
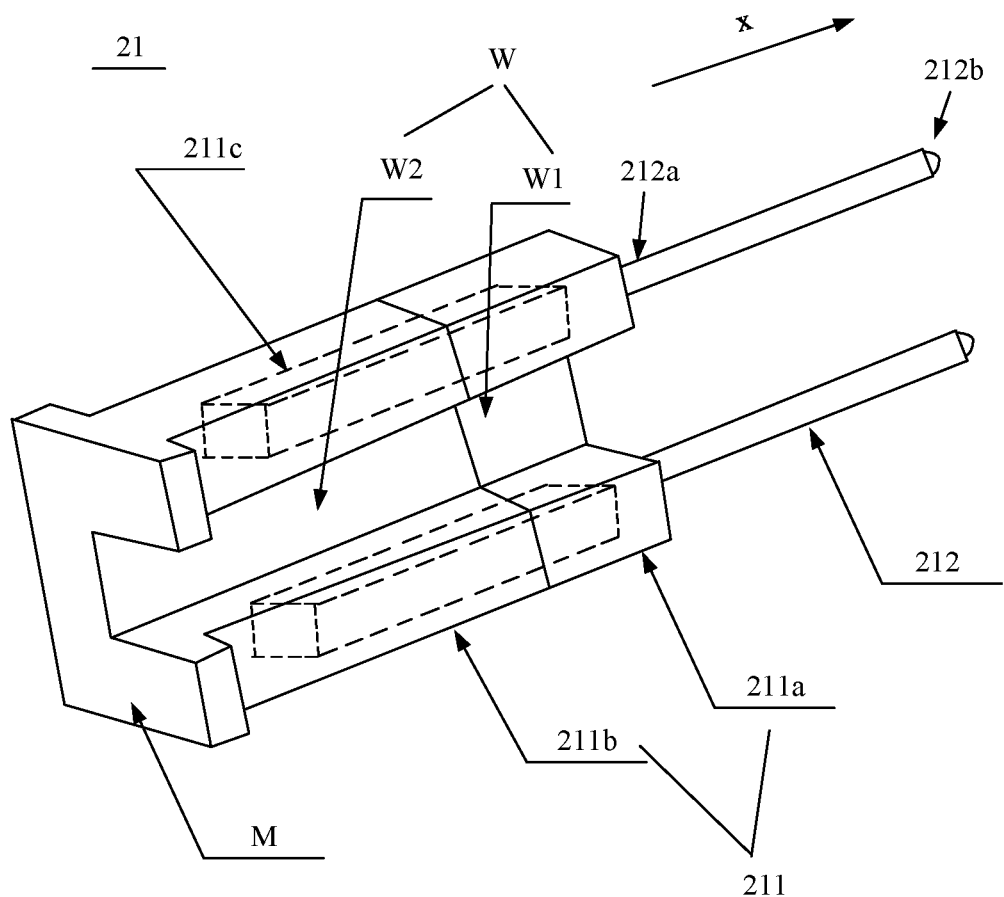
FIG. 7 is a schematic diagram of a structure of another MT clamp according to an embodiment of this application.

FIG. 7 is a schematic diagram of a structure of another MT clamp 21 according to an embodiment of this application. As shown in FIG. 7, a holder 211 includes a first support base 211a, a second support base 211b, and a connecting rod 211c.

The first support base 211a is connected to the second support base 211b by using the connecting rod 211c, and the first support base 211a and the second support base 211b that are connected are arranged in an extension direction of a guide rod 212. After the guide rod 212 is inserted into a guide hole, the extension direction of the guide rod 212 is parallel to a direction (namely, a target direction x) in which the guide rod 212 is inserted into the guide rod. Therefore, after the guide rod 212 is inserted into the guide hole, the first support base 211a and the second support base 211b are arranged in the target direction x.

The first support base 211a has a first sub-groove W1, and the second support base 211b has a second sub-groove W2. After the first support base 211a and the second support base 211b are connected by using the connecting rod 211c, the first sub-groove W1 and the second sub-groove W2 are connected to form an accommodating part W.

In FIG. 7, the holder 211 is obtained by connecting the first support base 211a and the second support base 211b by using the connecting rod 211c. Because the first support base is connected to the second support base by using the connecting rod, no special-purpose tool is required for disassembling and assembling. This ensures efficiency of disassembling and assembling.

That the first support base 211a is connected to the second support base 211b by using the connecting rod 211c may be implemented in the following manner: One end of the connecting rod 211c is connected to the first support base 211a, and the other end of the connecting rod 211c is connected to the second support base 211b.

In an optional implementation, the first support base 211a and the second support base 211b are fixedly connected (or statically connected) by using the connecting rod 211c. In an optional example, the connecting rod 211c implements a fixed connection between the first support base 211a and the second support base 211b in a clamping manner. For example, a part of the connecting rod 211c is clamped to the first support base 211a, and the connecting rod 211c is fixed to the first support base 211a after the clamping; and the other part of the connecting rod 211c is clamped to the second support base 211b, and the connecting rod 211c is fixed to the second support base 211b after the clamping. In another optional example, the connecting rod 211c implements a fixed connection between the first support base 211a and the second support base 211b in a threaded connection manner. For example, one end of the connecting rod 211c is connected to the first support base 211a in a threaded manner (for example, the end of the connecting rod 211c has an external thread, the first support base 211a has a threaded hole, and the end of the connecting rod 211c may be screwed into the threaded hole to implement the threaded connection), so that the end is fixedly connected to the first support base 211a; and the other end of the connecting rod 211c is connected to the second support base 211b in a threaded manner, so that the other end is fixedly connected to the second support base 211b (for example, the other end of the connecting rod 211c has an external thread, the second support base 211b has a threaded hole, and the other end of the connecting rod 211c may be screwed into the threaded hole to implement the threaded connection). In still another optional example, the connecting rod 211c implements a fixed connection between the first support base 211a and the second support base 211b in a threaded connection and clamping manner. For example, one end of the connecting rod 211c is connected to one of the first support base 211a and the second support base 211b in a threaded manner, and the other end of the connecting rod 211c is clamped to the other of the first support base 211a and the second support base 211b. Because the first support base is connected to the second support base in a clamping and/or threaded connection manner by using the connecting rod, no special-purpose tool is required for disassembling and assembling. This ensures efficiency of disassembling and assembling.

In another optional implementation, the first support base 211a is actively (or movably) connected to the second support base 211b by using the connecting rod 211c.

In an optional example, the connecting rod 211c implements an active connection between the first support base 211a and the second support base 211b in a clamping manner. The first support base 211a and the second support base 211b may generate a relative movement of a preset distance in the target direction x along the connecting rod 211c.

For example, a part of the connecting rod 211c is clamped to the first support base 211a, and the other part of the connecting rod 211c is clamped to the second support base 211b. The connecting rod 211c and the first support base 211a that are clamped can generate a relative movement of a first distance in the target direction x, and the connecting rod 211c and the second support base 211b that are clamped generates a relative movement of a second distance in the target direction x. A sum of the first distance and the second distance is equal to the preset distance. Alternatively, one end of the connecting rod 211c is fixedly connected to one of the first support base 211a and the second support base 211b (for example, in a clamping or threaded connection manner), the other end of the connecting rod 211c is clamped to the other of the first support base 211a and the second support base 211b, and the connecting rod 211c and the other of the first support base 211a and the second support base 211b that are clamped can generate a relative movement of a preset distance in the target direction x.

Figure 8:
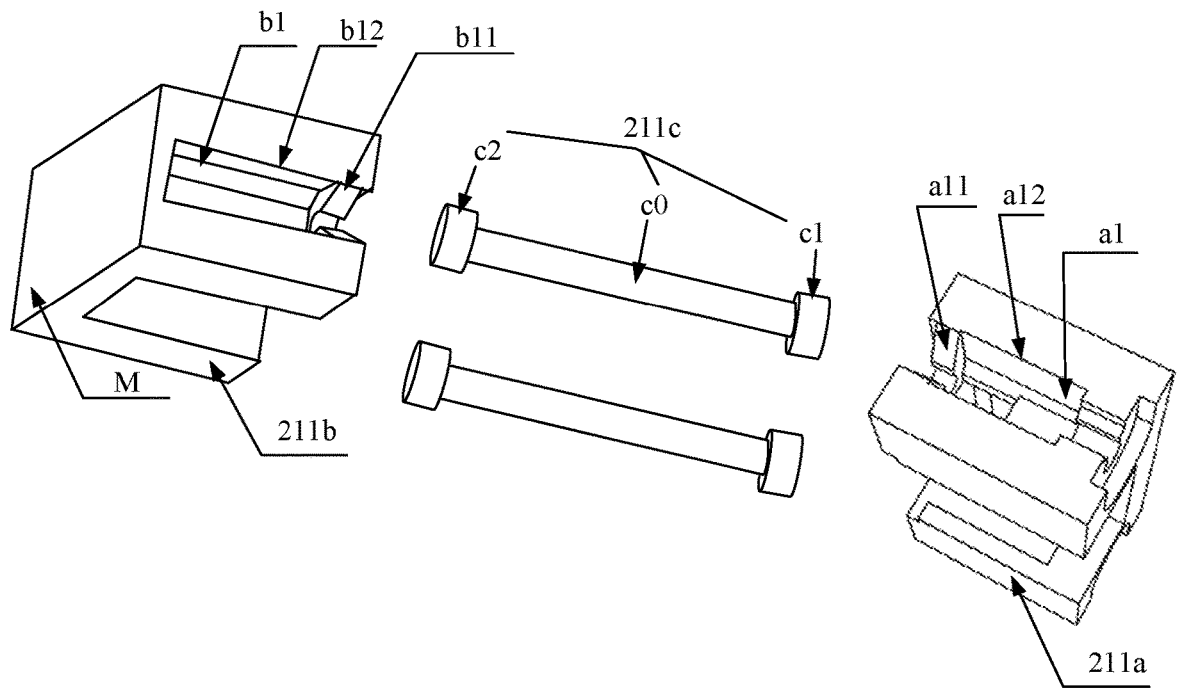
FIG. 8 is a schematic explosion diagram of an MT clamp according to an embodiment of this application.

FIG. 8 is a schematic explosion diagram of the MT clamp 21 according to an embodiment of this application (FIG. 8 does not show the guide rod). The connecting rod 211c includes a rod body c0, and a first clamping part c1 and a second clamping part c2 that are located at two ends of the rod body c0. The first support base 211a has a first accommodating groove a1, and the second support base 211b has a second accommodating groove b1. The first accommodating groove a1 is configured to accommodate a part of the connecting rod 211c, and has a third clamping part a11 clamped to the first clamping part c1. The second accommodating groove b1 is configured to accommodate the other part of the connecting rod 211c, and has a fourth clamping part b11 clamped to the second clamping part c2. Optionally, one of the first clamping part c1 and the third clamping part a11 is a clamping protrusion, and the other is a clamping groove; and/or one of the second clamping part c2 and the fourth clamping part b11 is a clamping protrusion, and the other is a clamping groove. FIG. 8 is described by using an example in which the first clamping part c1 and the second clamping part c2 are clamping protrusions, and the third clamping part a11 and the fourth clamping part b11 are clamping grooves. However, a structure of each clamping part is not limited, provided that the clamping part can implement a clamping function of the clamping part. In an optional example, a shape of the clamping protrusion matches a shape of the clamping groove, and the clamping protrusion can be actively placed in the clamping groove in the target direction, to implement active clamping in the target direction. For example, the clamping protrusion is a columnar clamping protrusion, and the clamping groove is a clamping groove having a columnar cavity. A length of the columnar cavity is greater than a length of the columnar clamping protrusion, to reserve a part of space for the columnar clamping protrusion to move in the target direction.

Figure 9:
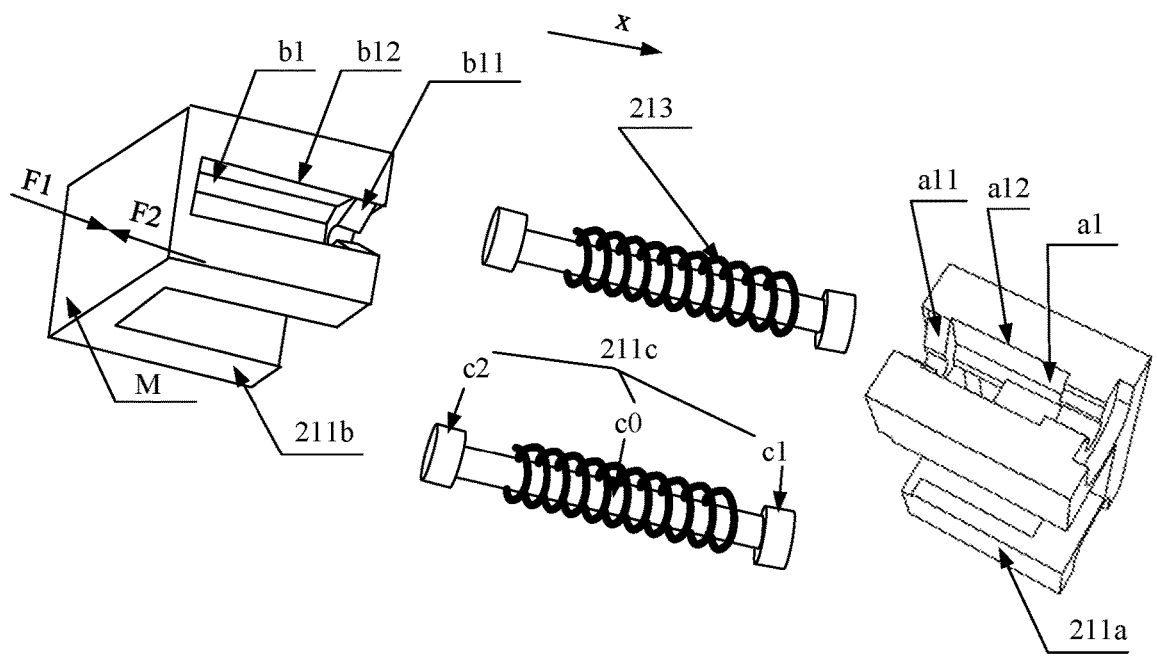
FIG. 9 is a schematic explosion diagram of another MT clamp according to an embodiment of this application.

FIG. 9 is a schematic explosion diagram of another MT clamp 21 according to an embodiment of this application (FIG. 9 does not show the guide rod). As shown in FIG. 9, on a basis that the first support base 211a is actively connected to the second support base 211b by using the connecting rod 211c, the MT clamp 21 may further include an elastic element 213 located in the holder 211.

It is assumed that the first end 212a of the guide rod 212 is fixedly connected to the first support base 211a. In this case, the second support base 211b may accept pushing force in the target direction, to implement insertion between the holder 211 and the MT port 11. As shown in FIG. 5 to FIG. 9, the second support base 211b has a pressing surface M along one end that is far away from the first support base 211a, and the pressing surface M is used by an operator to apply pushing force. The pressing surface M may be a flat surface or a curved surface. When the pressing surface M is a flat surface, the pushing force can be evenly applied. When the pressing surface M is a curved surface, for example, a concave surface, the pushing force can be applied in a centralized manner.

Correspondingly, the second support base 211b is further configured to: after being subject to pushing force F1 in the target direction x, deform the elastic element 213 by moving in the target direction x. Correspondingly, the elastic element 213 is configured to: after the deformation, transfer the pushing force F1 to the first support base 211a, and provide elastic force F2 opposite to the target direction x for the second support base 211b. The target direction x is the direction in which the guide rod is inserted into the guide hole. The pushing force F1 may push the first support base 211a to drive the guide rod 212 to be inserted into the MT port, to implement quick insertion of the MT clamp.

The elastic element is disposed in the holder, to implement buffering and force balancing when the MT plug is inserted into the MT port, avoid direct collision between and abrasion to the first support base and the second support base, and also avoid excessive concentration of stress on the guide rod 212 during insertion. Therefore, a damage probability of the MT clamp is reduced, interconnection reliability is improved, so that a lifespan of the MT clamp is prolonged, and maintenance costs are reduced.

In this embodiment of this application, there may be a plurality of assembling relationships between the elastic element 213 and each element in the MT clamp 21, provided that the pushing force F1 can be transferred and the elastic force F2 can be provided. In addition, there may be a plurality of types of elastic elements 213. In some optional examples, the elastic element may be a compression spring. In some other optional examples, the elastic element may be a spring plate. A type of the elastic element is not limited in this embodiment of this application, provided that corresponding elastic force can be provided.

As shown in FIG. 8 or FIG. 9, the first accommodating groove a1 has a first side opening a12, and the second accommodating groove b1 has a second side opening b12. The first accommodating groove a1 is configured to accommodate a part of the connecting rod 211c through the first side opening a12, and the second accommodating groove b1 is configured to accommodate the other part of the connecting rod 211c through the second side opening b12. As shown in FIG. 8 or FIG. 9, extension directions of the first side opening a12 and the second side opening b12 both are parallel to the extension direction of the guide rod 212. The side opening is disposed in the accommodating groove, so that the connecting rod 211c can be assembled into the accommodating groove from a side. This implements quick assembling of the connecting rod, and improves efficiency of disassembling and assembling.

Figure 10:
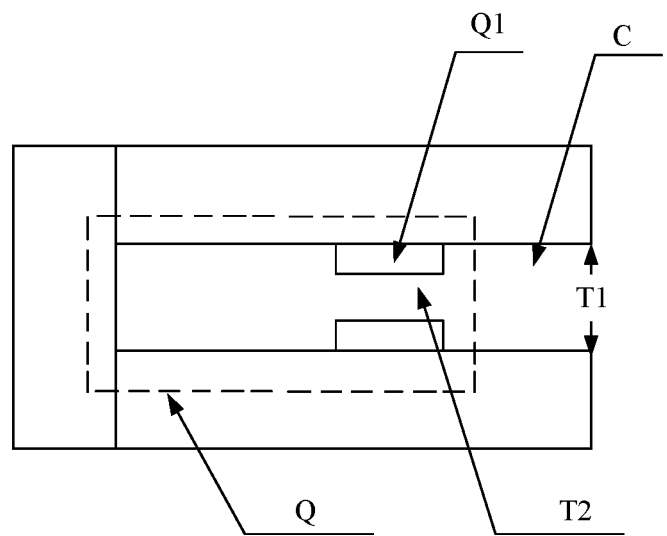
FIG. 10 is a schematic diagram of a structure principle of an accommodating groove according to an embodiment of this application.

It is assumed that an accommodating groove C is the first accommodating groove a1 or the second accommodating groove b1. Correspondingly, a support base on which the accommodating groove C is located is the first support base 211a or the second support base 211b. FIG. 10 is a schematic diagram of a structure principle of the accommodating groove C according to an embodiment of this application. As shown in FIG. 10, one end of the accommodating groove C has a first opening T1 that is configured to allow one end of the connecting rod 211c to pass through. It is assumed that a clamping part of the accommodating groove C is a clamping groove Q. Correspondingly, a clamping protrusion is disposed at one end that is of the connecting rod 211c and that is connected to the accommodating groove. In FIG. 10, the clamping groove Q in the accommodating groove C is enclosed by a baffle plate Q1 having a second opening T2 and an inner wall and a bottom of the accommodating groove C. During actual implementation, the clamping groove Q may alternatively be enclosed by the baffle plate Q1 having the second opening T2, the inner wall of the accommodating groove C, and another baffle plate. For example, an inner cavity of the accommodating groove C may be a cylindrical inner cavity or a cubic inner cavity.

A side wall of the accommodating groove C further has a side opening. In FIG. 10, the side opening is located on a side that is of the accommodating groove C that is outward perpendicular to the paper. The side opening is used for assembling the connecting rod 211c in the accommodating groove C. The clamping protrusion of the connecting rod 211c is clamped to the clamping groove after the assembling. For example, the side opening may be a rectangular opening. Optionally, the support base on which the accommodating groove C is located further includes a first installing cover, and the first installing cover is detachably connected to the side opening, for example, in a clamping manner. After a part of the connecting rod 211c is assembled in the accommodating groove C, the first installing cover is installed at the side opening, to be combined with the accommodating groove C to form a side-closed cavity having an opening at at least one end (an opening at one end in FIG. 10). In this way, the first installing cover may further implement specific supporting and position limitation on the connecting rod 211c, to reduce displacement of the connecting rod 211c in a non-target direction. For example, a shape of the first installing cover matches a shape of at least a part of the side opening. For example, the shape of the first installing cover is the same as the shape of at least the part of the side opening.

Both the accommodating groove C and the first installing cover are made of conductive plastic. Therefore, after the accommodating groove C is connected to the first installing cover, smaller space may be formed for the connecting rod 211c to pass through, and a region in which an electromagnetic wave passes through is also reduced, so that an electromagnetic wave shielding effect is effectively improved. In addition, because the conductive plastic is elastic, the accommodating groove C and the first installing cover may be tightly clamped through an interference fit.

It should be noted that FIG. 10 is merely an example of a structure of the accommodating groove provided for ease of understanding. During actual implementation, the accommodating groove may alternatively be of another structure, provided that the connecting rod 211c can be effectively accommodated. For example, the clamping groove in the accommodating groove may alternatively be disposed at another position instead of the bottom of the accommodating groove. Alternatively, a clamping protrusion is disposed in the accommodating groove. Correspondingly, a clamping groove is disposed at one end that is of the connecting rod 211c and that is connected to the accommodating groove.

In the foregoing embodiment, the elastic element 213 may alternatively not be disposed in the holder 211, and a function the same as that of the elastic element is implemented in another manner. For example, the connecting rod 211c is made of an elastic material. The connecting rod can implement a function of connecting the first support base 211a and the second support base 211b, and can also deform after the second support base 211b is subject to the pushing force F1 in the target direction x. In addition, the connecting rod transfers the pushing force F1 to the first support base 211a, and provides the elastic force F2 opposite to the target direction x for the second support base 211b. For example, the elastic material is high elastic silica gel. Further, the elastic material may be high elastic conductive silica gel. This can further improve electromagnetic wave shielding by the entire holder.

Both FIG. 5 and FIG. 7 are described by using an example in which the accommodating part W is a groove. In this embodiment of this application, the accommodating part W may alternatively be of another structure, provided that the pigtail can pass through.

Figure 11:
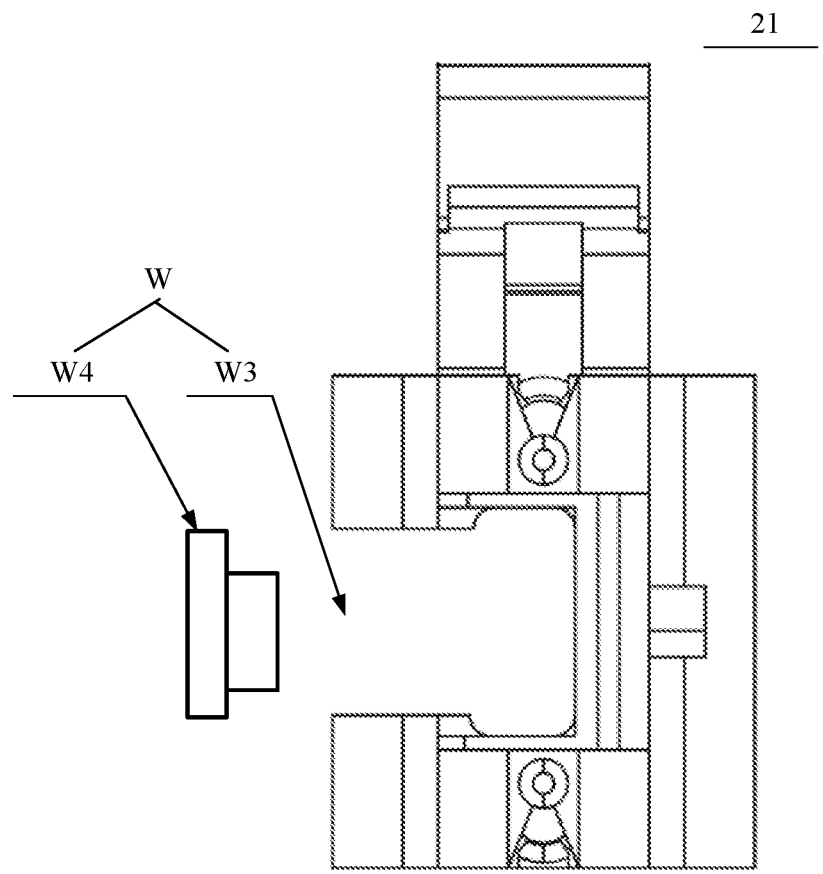
FIG. 11 is a schematic diagram of a side-view structure of still another MT clamp according to an embodiment of this application.

FIG. 11 is a schematic diagram of a side-view structure of still another MT clamp 21 according to an embodiment of this application. In addition to a groove W3, the accommodating part W may further include a cover W4. The cover W4 is detachably connected to the groove W3, for example, in a clamping manner. The groove W3 has two opposite openings and one side opening. After the pigtail passes through the groove W3, the cover W4 is installed at the side opening of the groove W3, to be combined with the groove W3 to form a side-closed cavity having openings at two ends. In this way, the cover W4 may further implement specific supporting and position limitation on the pigtail in the groove W3, to reduce a movement of the pigtail. A structure of the groove W3 may be any structure of the groove in FIG. 5 or FIG. 7.

Because both the groove and the cover are made of conductive plastic, after the groove and the cover are connected, smaller space may be formed for the pigtail to pass through, and a region in which an electromagnetic wave passes through is further reduced, so that an electromagnetic wave shielding effect is effectively improved. In addition, because the conductive plastic is elastic, the groove and the cover may be tightly clamped through an interference fit.

It should be noted that there may be one or more connecting rods 211c in the holder 211. Correspondingly, a quantity of accommodating grooves in each support base is equal to a quantity of connecting rods 211c, so that the connecting rods 211c are effectively accommodated. As shown in FIG. 8 and FIG. 9, the holder 211 includes two connecting rods 211c. Correspondingly, the first support base 211a has two first accommodating grooves a1, and the second support base 211b has two second accommodating grooves b1. The two connecting rods 211c are respectively assembled in the two first accommodating grooves a1, and the two connecting rods 211c are respectively assembled in the two second accommodating grooves b1. The two first accommodating grooves a1 are located on two sides of a longitudinal axis cross section of the support base. Optionally, for each of the first support base 211a and the second support base 211b, the two accommodating grooves on the support base are symmetrically disposed with respect to the longitudinal axis cross section of the support base. The longitudinal axis cross section is parallel to a length direction of the holder, and is perpendicular to a width direction of the holder. For example, when there are two guide rods connected to the holder, and the two guide rods are symmetrically disposed, the longitudinal axis cross section is coplanar with a symmetrical plane of the two guide rods.

When the two first accommodating grooves a1 of the first support base 211a are symmetrically disposed, and the two second accommodating grooves b1 of the second support base 211b are symmetrically disposed, longitudinal axis cross sections of the two support bases are coplanar, and the two assembled connecting rods 211c are also symmetrical with respect to the longitudinal axis cross sections. This can implement force balancing on the holder 211 obtained through assembling, ensure overall stability of the holder, and can further improve reliability of mating between the MT plug and the MT port when the MT plug is inserted into the MT port. During actual implementation in this embodiment of this application, the two first accommodating grooves a1 may alternatively be not completely symmetric. For example, in FIG. 12, one of the two first accommodating grooves a1 is a through groove, and has an opening on the pressing surface M; and the other is a blind groove, and is closed on the pressing surface M. Optionally, both the two first accommodating grooves a1 may be blind grooves, so that an opening area is reduced, and electromagnetic wave leakage is reduced.

Further, when the MT clamp 21 further includes an elastic element 213, a quantity of elastic elements 213 may match a quantity of connecting rods 211c, for example, is equal to the quantity of connecting rods 211c. As shown in FIG. 9, if the holder 211 includes two connecting rods 211c, the MT clamp 21 further includes two elastic elements 213, and the two connecting rods 211c are respectively assembled in the two elastic elements 213. Optionally, when the elastic element 213 is a spring, the spring is sheathed on a corresponding connecting rod. When the MT plug is inserted into the MT port, the two elastic elements 213 may provide buffering and implement force balancing, to ensure stability of insertion.

Figure 12:
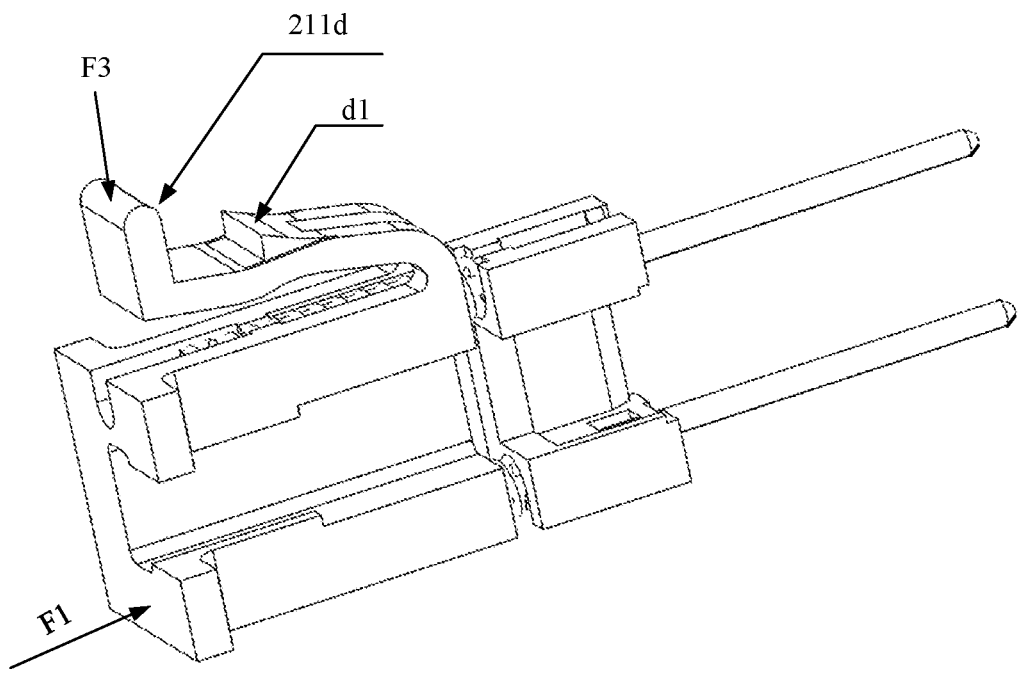
FIG. 12 is a schematic diagram of a structure of still another MT clamp according to an embodiment of this application.

As shown in FIG. 1, after being connected to the MT optical fiber 22, the MT clamp 21 is configured to be inserted into the MT port 11 of the MT/MPO adapter 1. An inner wall of the MT port 11 has a groove. FIG. 12 is a schematic diagram of a structure of still another MT clamp 21 according to an embodiment of this application. Corresponding to the structure of the MT port 11, the holder 211 has a fin 211d, a buckle d1 is disposed on the fin 211d, and the buckle d1 is configured to: after the holder 211 is subject to the pushing force F1 in the target direction x, when the holder 211 moves towards the groove, be clamped to the groove of the MT/MPO adapter 1; and after the fin 211d is subject to pressure F3 towards the holder 211, release the clamping from the groove under driving of the fin 211d. This can implement quick insertion and removal of the MT plug, in other words, can implement quick locking and unlocking between the MT plug and the MT port.

As described above, when the MT clamp 21 includes the elastic element 213, after the elastic element 213 deforms, the elastic element 213 provides the elastic force F2 opposite to the target direction x for the second support base 211b. After the buckle d1 is clamped to the groove of the MT/MPO adapter 1, the elastic element 213 still maintains a deformed state, and therefore still provides the elastic force F2. In this case, when the buckle d1 releases the clamping from the groove, the second support base 211b reversely ejects in the target direction x because of the elastic force F2, to drive the first support base 211a to eject from the MT port 11, so that the holder 211 can be quickly removed from the MT port 11, and removal of the holder 211 is buffered to some extent.

In an optional manner, the fin 211d is a two-sided fin. In other words, the holder 211 has two fins that are symmetrically disposed.

In another optional manner, the fin 211d is a one-sided fin. In other words, the holder 211 has one fin. Disposing the one-sided fin can quickly implement one-sided locking and unlocking between the MT plug and the MT port, and reduce insertion and removal operation space. In addition, compared with the two-sided fin, the one-sided fin occupies smaller space. This can implement insertion and removal, effectively reduce a space size of the MT clamp, implement miniaturization of the MT clamp, help install more MT/MPO adapters on a board of the optical communications device, and implement high-density MT/MPO adapter layout.

Figure 13:
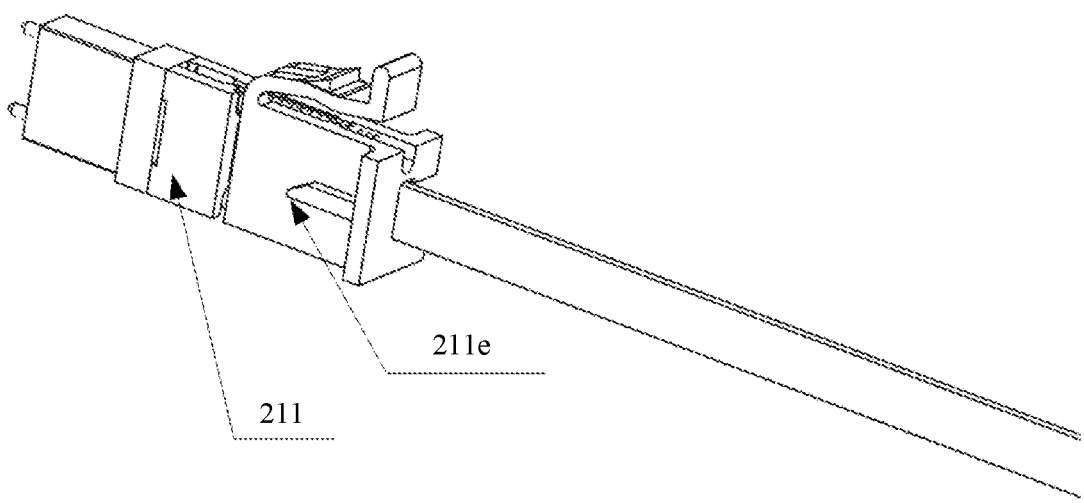
FIG. 13 is a schematic diagram of a structure of an MT clamp according to another embodiment of this application.

During actual implementation, the inner wall of the MT port 11 further has a guide groove. FIG. 13 is a schematic diagram of a structure of an MT clamp 21 according to another embodiment of this application. Corresponding to the structure of the MT port 11, the holder 211 has a guide pin 211e, and the guide pin 211e is configured to be clamped to the guide groove. Disposing the guide pin 211e can implement cooperation with the guide groove for guiding, prevent the MT clamp from being reversely inserted, and ensure stable and correct insertion and removal between the MT plug 2 and the MT port 11.

In this embodiment of this application, there may be a plurality of manners for the first end 212a of the guide rod 212 to be fixedly connected to the holder 211. In an optional manner, the first end 212a of the guide rod 212 is fixedly connected to the holder 211 through welding. In another optional manner, if the holder 211 is of an integrated structure, and a material of the guide rod 212 is the same as that of the holder 211, the guide rod 212 may be fixedly connected to the holder 211 through integral molding. In other words, the guide rod 212 and the holder 211 are of an integrated structure manufactured by performing a same process. If the holder 211 is of a structure obtained by connecting the first support base 211a and the second support base 211b by using the connecting rod 211c, and the material of the guide rod 212 is the same as that of the first support base 211a, the guide rod 212 may be fixedly connected to the first support base 211a through integral molding. In other words, the guide rod 212 and the first support base 211a are of an integrated structure manufactured by performing a same process. In still another optional manner, the first end 212a of the guide rod 212 is fixedly connected to the holder 211 in a threaded connection manner. In yet another optional manner, the first end 212a of the guide rod 212 is fixedly connected to the holder 211 in a clamping manner. No special-purpose tool is required for disassembling and assembling in the threaded connection manner and the clamping manner. This ensures efficiency of disassembling and assembling. Because the guide rod 212 is fixedly connected to the holder 211 in a detachable connection manner, the guide rod 212 may be detached from the holder 211 when the guide rod 212 is not used. This implements miniaturization of each component of the MT clamp, reduce space occupation when the MT clamp is not used, and implement replacement of each component. Because an abrasion rate of the guide rod is relatively high, when the guide rod is abraded or the like, the guide rod may be replaced, so that a lifespan of the holder is prolonged, and maintenance costs are reduced.

Figure 14:
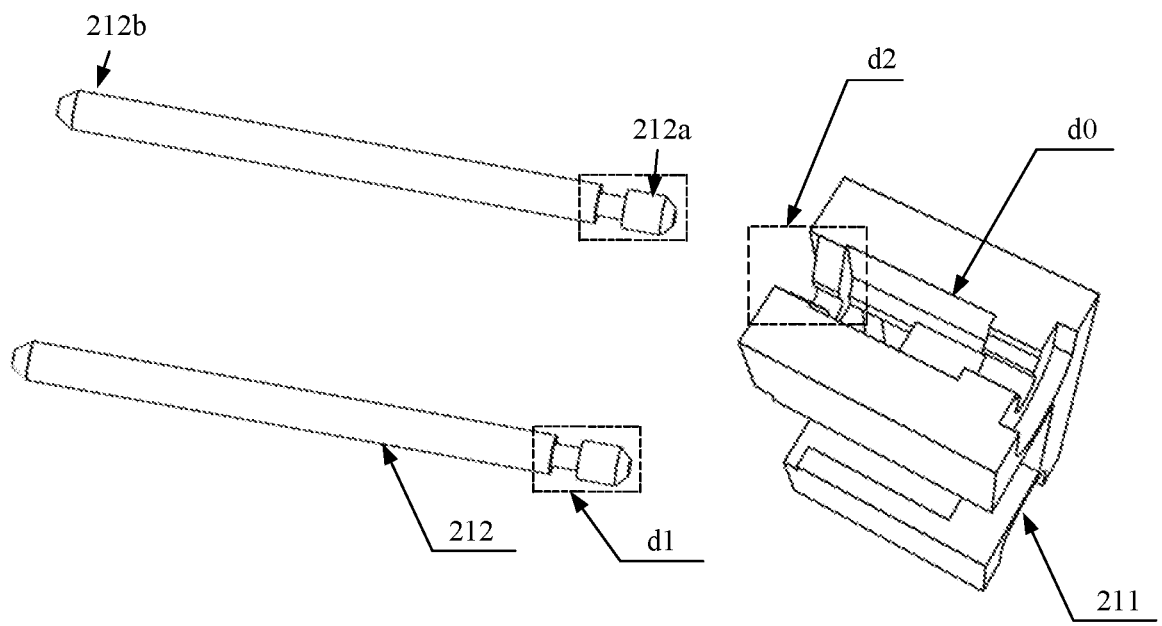
FIG. 14 is a schematic diagram of structures of a guide rod and a holder according to an embodiment of this application.

FIG. 14 is a schematic diagram of structures of the guide rod 212 and the holder 211 according to an embodiment of this application. In FIG. 14, an example in which the holder 211 is of a detachable structure is used for description, but the structure of the holder 211 is not limited. The first end 212a of the guide rod 212 has a fifth clamping part d1, the holder 211 has a sixth clamping part d2, and the guide rod 212 is fixedly connected to the holder 211 by clamping the fifth clamping part d1 and the sixth clamping part d2. For example, one of the fifth clamping part d1 and the sixth clamping part d2 is a clamping protrusion, and the other is a clamping groove. However, a structure of each clamping part is not limited, provided that the clamping part can implement a clamping function of the clamping part. In an optional example, a shape of the clamping protrusion matches a shape of the clamping groove, and the clamping protrusion can be placed in the clamping groove to implement clamping. For example, the clamping protrusion is a columnar clamping protrusion, and the clamping groove is a clamping groove having a columnar cavity. When the fifth clamping part d1 is a clamping protrusion, and the sixth clamping part d2 is a clamping groove, for structures of the clamping protrusion and the clamping groove, refer to the structures of the clamping protrusion and the clamping groove shown in FIG. 10. A difference from FIG. 10 lies in that a size difference between an exterior of the clamping protrusion and an interior of the clamping groove is relatively small, so that a fixed connection is implemented in a clamping manner.

In FIG. 14, an example in which the fifth clamping part d1 is a clamping groove and the sixth clamping part d2 is a clamping protrusion is used for description. The clamping groove is an annular groove, and the clamping protrusion is an annular protrusion. Optionally, the holder 211 further includes a third accommodating groove d0, and the clamping protrusion is located in the third accommodating groove d0. The third accommodating groove d0 has a side opening. The side opening is used for assembling the first end of the guide rod 212 in the holder 211. The clamping groove of the guide rod 212 is clamped to the clamping protrusion after the assembling. For example, the side opening may be a rectangular opening. Optionally, the holder 211 further includes a second installing cover, and the second installing cover is detachably connected to the side opening, for example, in a clamping manner. After the first end of the guide rod 212 is assembled in the third accommodating groove d0, the second installing cover is installed at the side opening, to be combined with the holder 211 to form a side-closed cavity having an opening at at least one end. In this way, the second installing cover may further implement specific supporting and position limitation on the guide rod 212, to reduce a movement of the guide rod 212 in a non-target direction. For example, a shape of the second installing cover matches a shape of at least a part of the side opening. For example, the shape of the second installing cover is the same as the shape of at least the part of the side opening. Both the third accommodating groove d0 and the second installing cover are made of conductive plastic. Therefore, after the third accommodating groove d0 is connected to the second installing cover, smaller space may be formed for the guide rod 212 to pass through, and a region in which an electromagnetic wave passes through is also reduced, so that an electromagnetic wave shielding effect is effectively improved. In addition, because the conductive plastic is elastic, the third accommodating groove d0 and the second installing cover may be tightly clamped through an interference fit.

Further, In FIG. 14, it is assumed that the holder 211 is a structure obtained by connecting the first support base 211a and the second support base 211b by using the connecting rod 211c. In this case, when the first support base 211a has both the first accommodating groove a1 and the third accommodating groove d0, the two accommodating grooves may be connected. This simplifies a manufacturing process. In addition, if the holder 211 includes the first installing cover that is detachably connected to the first accommodating groove a1 and the second installing cover that is detachably connected to the third accommodating groove d0, the two installing covers may be integrated into one installing cover to implement a function of the two installing covers. This simplifies a manufacturing process, and improves efficiency of disassembling and assembling.

According to the MT clamp provided in this embodiment of this application, after the holder is connected to the MT optical fiber through the guide rod that is fixed to the holder, the pigtail passes through the accommodating part of the holder, to implement assembling of the MT clamp and the MT optical fiber. Therefore, no special-purpose tool is required for disassembling and assembling. This effectively improves efficiency of disassembling and assembling. In addition, the MT clamp has a relatively simple structure, and occupies relatively small space. This can implement overall miniaturization of the MT plug. In addition, the MT clamp is pluggable, and is detachably connected to the MT optical fiber, so that a board can be assembled before the optical communications device is delivered from a factory, and a device on the board can be quickly repaired after delivery.

Figure 15:
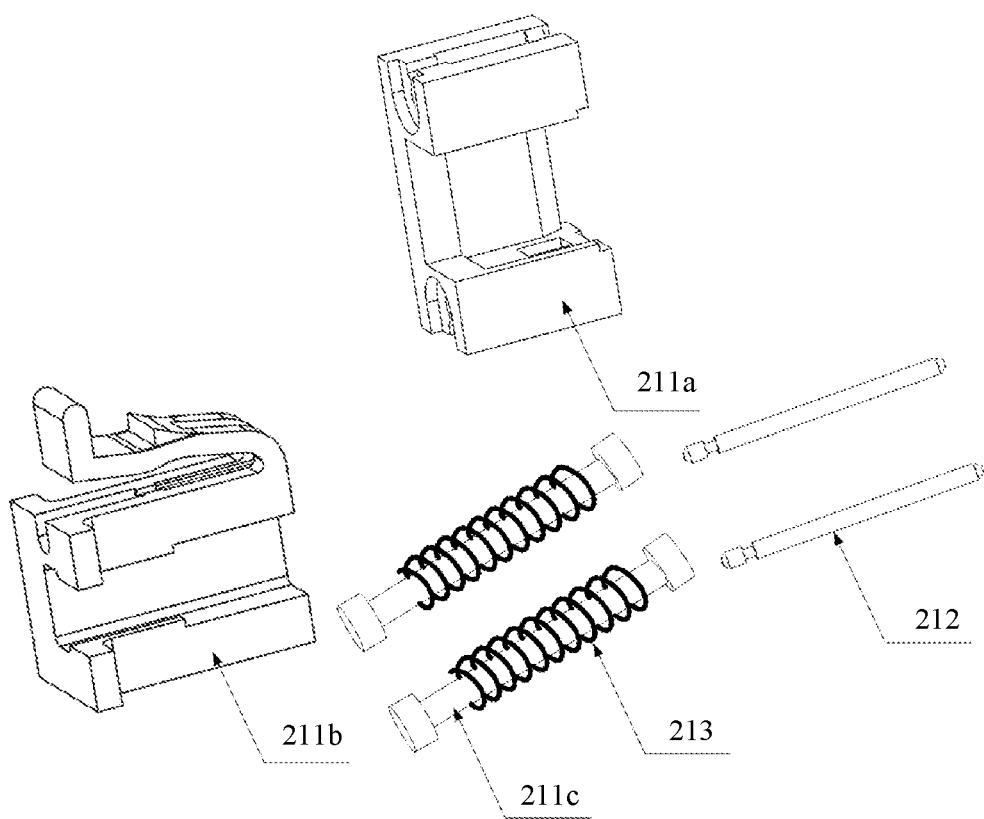
FIG. 15 is a schematic diagram of a detaching result of an MT clamp shown in FIG. 12 according to an embodiment of this application.

As described above, when the holder of the MT clamp 21 is detachable, the holder and the guide rod are also detachable. FIG. 15 is a schematic diagram of a detaching result of the MT clamp 21 shown in FIG. 12 according to an embodiment of this application. As shown in FIG. 15, the first support base 211a, the second support base 211b, the connecting rod 211c, the guide rod 212, and the elastic element 213 are obtained by detaching the MT clamp 21. These components all can be repaired or replaced, so that a lifespan of the MT clamp is prolonged, and maintenance costs are reduced. In addition, a volume of each component is relatively small, so that space occupation is reduced.

It should be noted that, in the foregoing embodiment, the MT plug is described only by using a detachable MT plug as an example. During actual implementation, the MT plug may alternatively be implemented in another manner. For example, the MT clamp of the MT plug includes a base and a cover. The base and the cover are fixed by using a screw and then are sheathed on the optical fiber head of the MT optical fiber, so that the MT clamp is fixedly connected to the MT optical fiber. For another example, the MT clamp may be fixedly connected to the MT optical fiber in a gluing manner. In these manners, the MT clamp may be made of the foregoing conductive plastic.

In an optional manner, the adapter assembly further includes a shielding gasket. The shielding gasket can shield an electromagnetic wave, and the shielding gasket is located between the MT/MPO adapter 1 and the panel 3. Disposing the shielding gasket can implement effective sealing and reliable contact between the MT/MPO adapter and the panel, thereby better preventing electromagnetic leakage.

For example, the shielding gasket is a flexible conductive gasket. Because the flexible conductive gasket is elastic, abrasion to the MT/MPO adapter 1 and the panel 3 can be reduced, so that lifespans of the MT/MPO adapter and the panel are prolonged.

In conclusion, in the adapter assembly provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Figure 16:
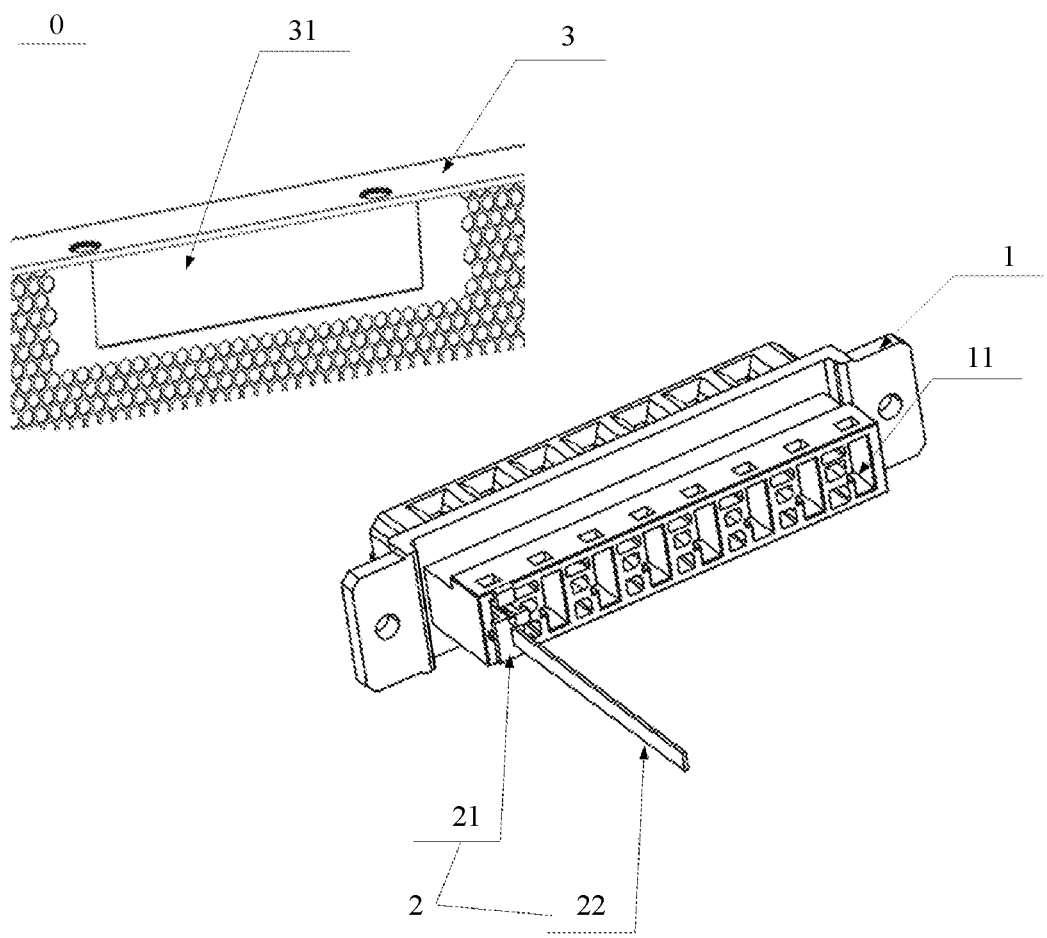
FIG. 16 is a schematic diagram of a structure of an optical communications device according to an embodiment of this application.
Figure 17:
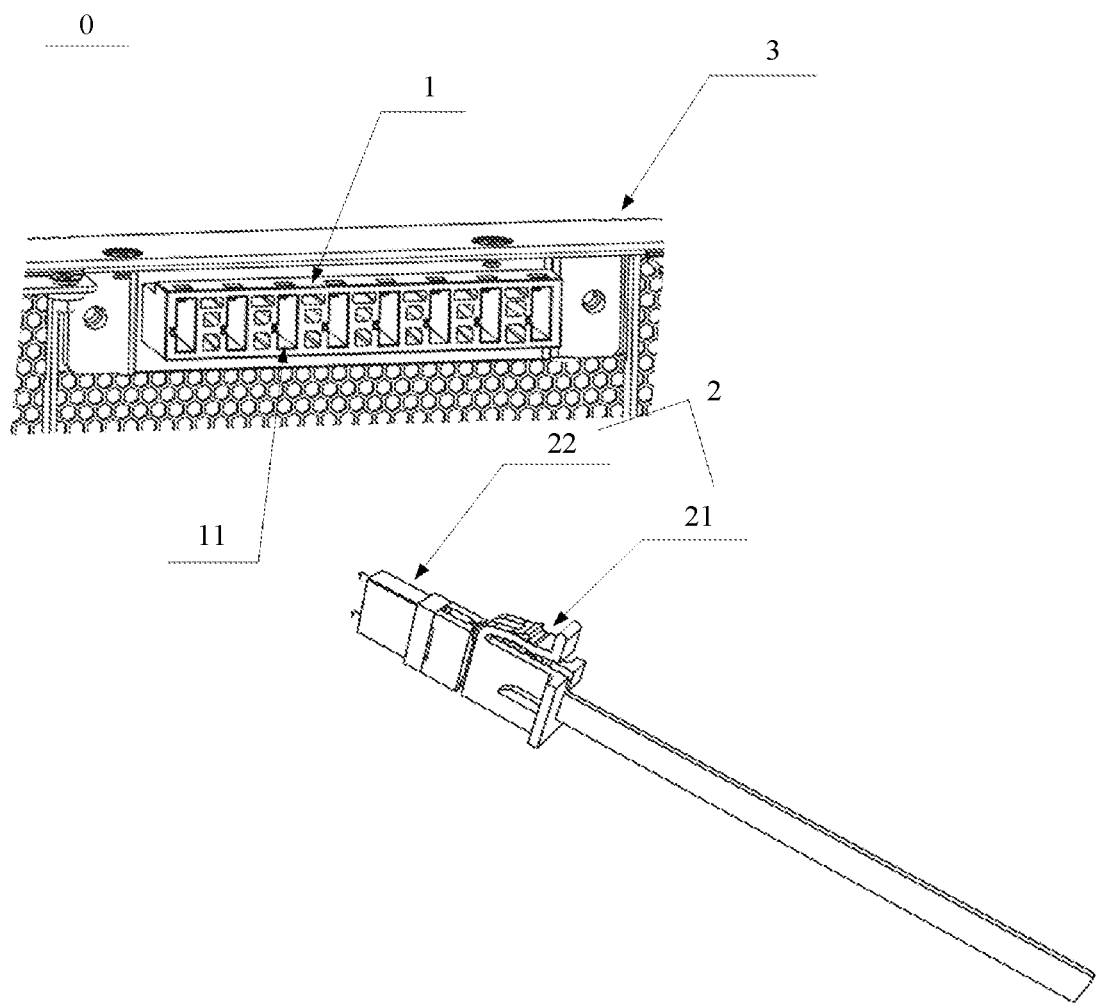
FIG. 17 is a schematic diagram of a structure of another optical communications device according to an embodiment of this application.

FIG. 16 and FIG. 17 are schematic diagrams of structures of an optical communications device 0 in different states according to an embodiment of this application. The optical communications device 0 may be a high-speed high-frequency board such as a router board or a switch board. The board may support communication by using co-packaged on-board optics.

For an explosion view of the optical communications device 0, refer to FIG. 1. Details are not described in this embodiment of this application. As shown in FIG. 1, FIG. 16, and FIG. 17, the optical communications device 0 includes:

the panel 3, where the panel 3 has the hole 31; and the adapter assembly, where the adapter assembly includes the MT/MPO adapter 1 and the MT plug 2, and the MT/MPO adapter 1 is installed on the hole 31. The adapter assembly is any adapter assembly provided in this embodiment of this application. For ease of viewing, in FIG. 16, the MT/MPO adapter is not fixed to the hole 31 of the panel 3, and the MT plug 2 is inserted into the MT port 11 of the MT/MPO adapter 1. In FIG. 17, it is assumed that the MT/MPO adapter 1 is fixed to the hole 31 of the panel 3, and the MT plug 2 is not inserted into the MT port 11 of the MT/MPO adapter 1. For example, the panel 3 has a plurality of holes 31, there are a plurality of adapter assemblies, and the plurality of adapter assemblies are fixed to the plurality of holes 31. Each adapter assembly is configured to be connected to the MPO plug.

The flange plate 10 of the MT/MPO adapter 1 is made of conductive plastic.

In the optical communications device provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Figure 18:
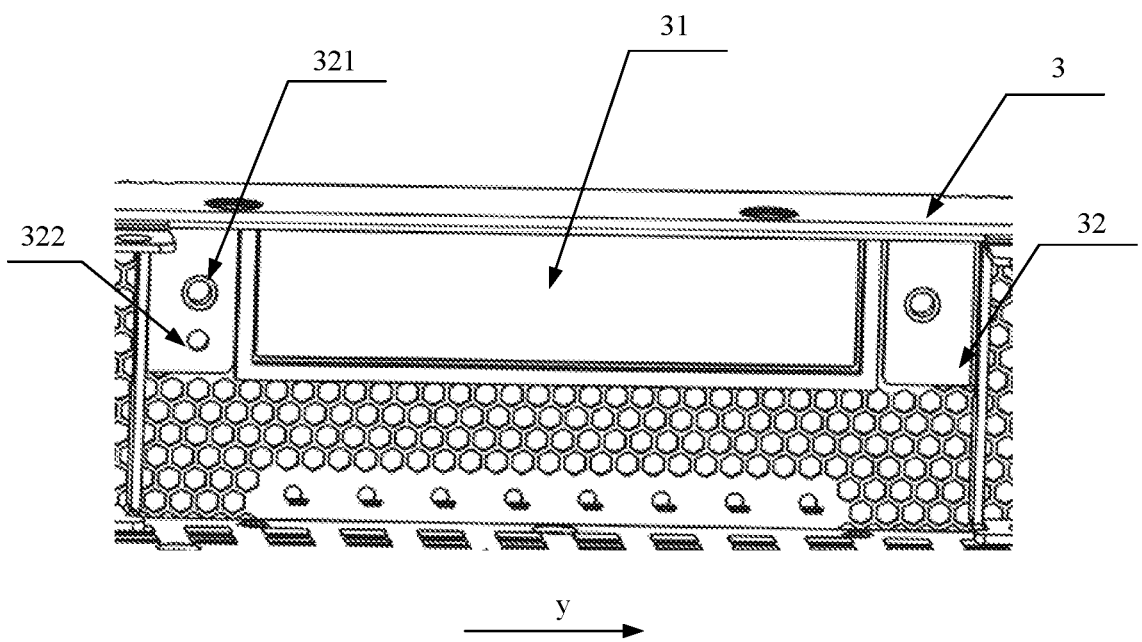
FIG. 18 is a schematic diagram of a partial structure of still another optical communications device according to an embodiment of this application.

FIG. 18 is a schematic diagram of a partial structure of an optical communications device according to an embodiment of this application. As shown in FIG. 18, the optical communications device 0 further includes:

two mechanical parts 32, where the two mechanical parts are fixed to two sides of the hole 31 of the panel 3 in a length direction y of the hole 31. For example, the mechanical part may be a metal part, and may be made of aluminum alloy or steel. The mechanical part 32 may be riveted to the panel 3.

Figure 19:
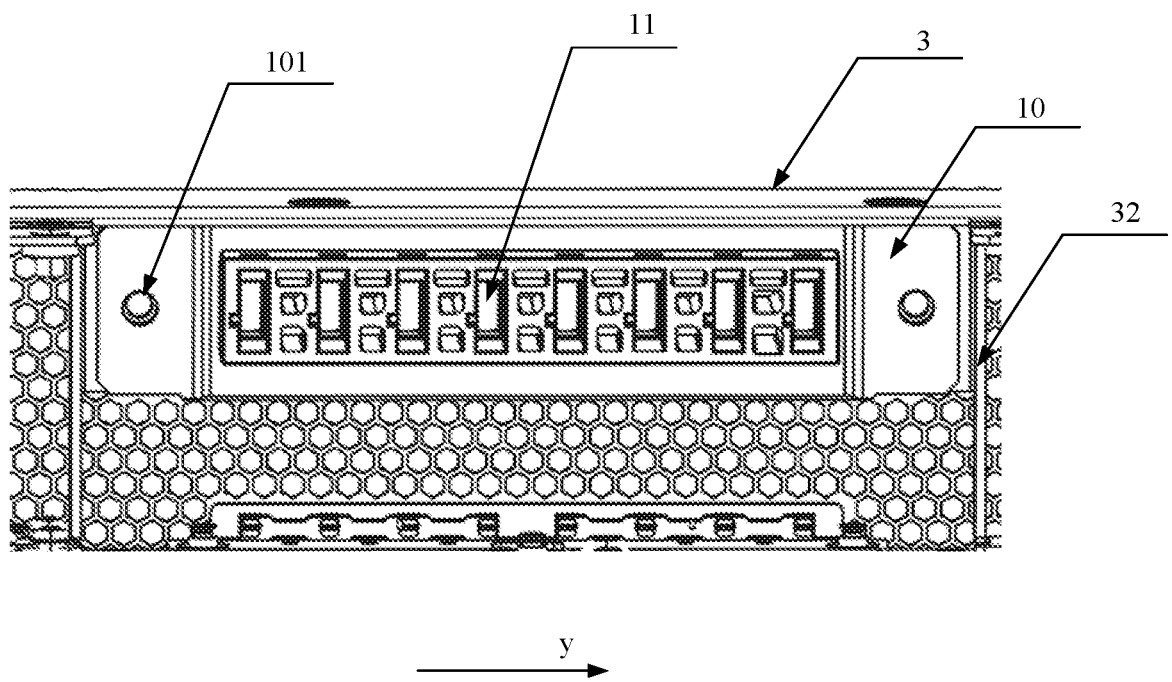
FIG. 19 is a schematic diagram of a partial structure of another optical communications device according to an embodiment of this application.

FIG. 19 is a schematic diagram of a partial structure of another optical communications device according to an embodiment of this application. As shown in FIG. 19, two ends of the flange plate 10 of the MT/MPO adapter are respectively fixed to the two mechanical parts 32 to be installed on the hole 31 of the panel 3.

The MT/MPO adapter is not directly connected to the panel, but is indirectly connected to the panel by using the mechanical part. When providing a basis for fixedly assembling the MT/MPO adapter, the mechanical part can reduce damage to the panel, and enhance strength of the panel. In addition, because the strength of the panel is improved, deformation of the panel caused by an excessively large hole of the panel can be prevented.

For example, the optical communications device further includes a screw (not shown in FIG. 19). As shown in FIG. 18, each mechanical part 32 has a second fixing hole 321; and two ends of the flange plate 10 in the length direction y each have a first fixing hole 101.

Each of the two ends of the flange plate 10 is fixed to the mechanical part 32 by using a screw that passes through the first fixing hole 101 and the second fixing hole 321. Optionally, at least one of the first fixing hole 101 and the second fixing hole 321 is a threaded hole having an internal thread, and the screw has an external thread. This implements an effective connection between a screw and a threaded hole, thereby implementing effectively fixing between the flange plate 10 and the mechanical part 32. For example, the first fixing hole 101 is a non-threaded hole, and the second fixing hole 321 is a threaded hole.

In an optional manner, the mechanical part 32 includes a strip-shaped reinforcing rib. If the mechanical part is a strip-shaped reinforcing rib, the panel can be reinforced, so that a lifespan of the panel is prolonged. An extension direction of the strip-shaped reinforcing rib is parallel to a width direction of the hole 31. In a first optional example, the strip-shaped reinforcing rib is relatively wide. For example, a width of the strip-shaped reinforcing rib is a first width in which the second fixing hole 321 can be disposed. In a second optional manner, the strip-shaped reinforcing rib is relatively narrow. For example, a width of the strip-shaped reinforcing rib is a second width, and the second width is less than the first width. The mechanical part 32 further includes a block-shaped reinforcing rib, and the block-shaped reinforcing rib is located at one end of the strip-shaped reinforcing rib (for example, in FIG. 18, the block-shaped reinforcing rib is located at an upper end of the strip-shaped reinforcing rib) and is fixedly connected to the strip-shaped reinforcing rib. The block-shaped reinforcing rib is configured to dispose the second fixing hole 321. Compared with the first example, the second example has a smaller area of the mechanical part, and correspondingly uses fewer materials, thereby reducing costs.

As shown in FIG. 18, the panel 3 has a locating hole 322. Correspondingly, as shown in FIG. 3, the flange plate has the guide pin 102, and the guide pin 102 is configured to be inserted into the locating hole 322 of the panel 3. For example, the guide pin 102 is disposed on a side on which the MPO port 12 of the flange plate 10 is located. When the MT/MPO adapter is installed on the panel, the MPO port 12 of the MT/MPO adapter is inserted into the hole from one side of the hole, the guide pin 102 is inserted into the locating hole 322 of the panel 3, and then the MPO port 12 is exposed from the other side of the hole. Disposing the guide pin and the locating hole can prevent the MT/MPO adapter from being reversely installed, and ensure that the MT/MPO adapter is stably and correctly connected to the hole.

Figure 20:
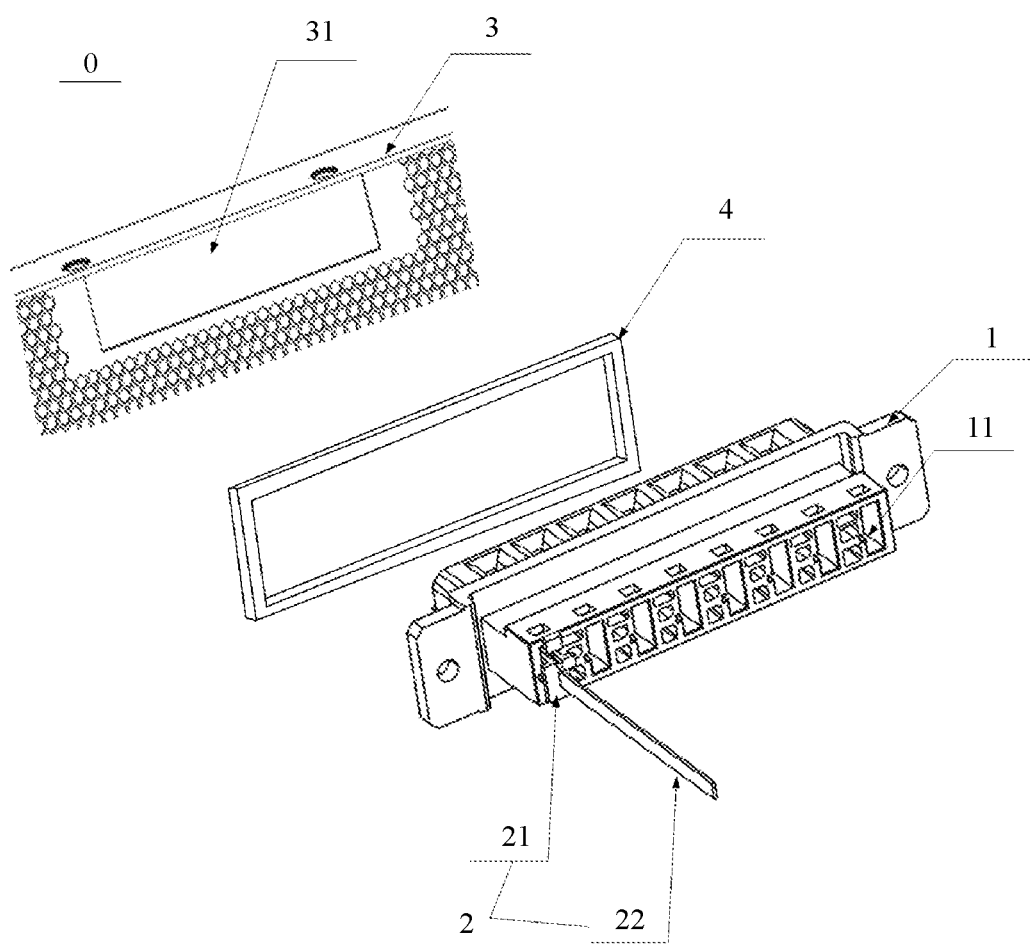
FIG. 20 is a schematic explosion diagram of an optical communications device according to an embodiment of this application.

FIG. 20 is a schematic explosion diagram of an optical communications device 0 according to an embodiment of this application. As shown in FIG. 20, the optical communications device 0 further includes a shielding gasket 4. The shielding gasket can shield an electromagnetic wave, and the shielding gasket 4 is located between the MT/MPO adapter 1 and the panel 3. Disposing the shielding gasket can implement effective sealing and reliable contact between the MT/MPO adapter and the panel, thereby better preventing electromagnetic leakage. The adapter assembly may include the shielding gasket 4.

For example, the shielding gasket 4 is a flexible conductive gasket. Because the flexible conductive gasket is elastic, abrasion to the MT/MPO adapter 1 and the panel 3 can be reduced, so that lifespans of the MT/MPO adapter and the panel are prolonged.

In conclusion, in the optical communications device provided in this embodiment of this application, because the flange plate is made of conductive plastic, the MT/MPO adapter can implement large-area electromagnetic wave shielding, so that a security risk is reduced. In addition, because the conductive plastic is elastic, abrasion to the flange plate can be reduced, so that a lifespan of the flange plate is prolonged.

Moreover, after all MT ports of the MT/MPO adapter are connected to an MT clamp with an opening area of 3.25*1.95 square millimeters, each adapter assembly can implement at least 10 dB shielding for an electromagnetic wave whose frequency range is from 0 GHz to 35 GHz. In this way, even if a plurality of adapter assemblies are installed on one panel, electromagnetic wave shielding can be effectively implemented. Therefore, the optical communications device provided in this embodiment of this application supports installation of a plurality of adapter assemblies, to implement multi-fiber coiling of the panel and implement a high bandwidth of the panel. For example, one board may provide 4 to 8 MPO ports (in other words, 4 to 8 adapter assemblies are installed).

An embodiment of this application further provides an optical communications system. The optical communications system includes the foregoing one or more optical communications devices. The optical communications device may be a high-speed high-frequency board such as a router or a switch.

In the accompanying drawings of embodiments, an example in which there is one MT/MPO adapter 1 and there is one MT plug 2 configured to be inserted into the MT/MPO adapter 1 is used for description. During actual implementation, there may be a plurality of MT/MPO adapters 1, and there are a plurality of MT plugs 2 configured to be inserted into the MT/MPO adapters 1. Details are not described in embodiments of this application.

In this application, a term "and/or" merely describes an association relationship between associated objects and indicates that three relationships may exist. For example, A and/or B may indicate the following cases: Only A exists, both A and B exist, and only B exists. In addition, the character "/" in this specification generally represents an "or" relationship between the associated objects.

In this application, terms "first" and "second" merely used for description, but cannot be understood as an indication or implication of relative importance. A term "a plurality of" means two or more, unless otherwise expressly limited. "A refers to B" means that A is the same as B, or A is a simple variant of B.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An adapter assembly, wherein the adapter assembly is configured to be installed on a hole of a panel, and the adapter assembly comprises:
   a mechanical transmission (MT) to multi-fiber push on (MPO) adapter (MT/MPO adapter), wherein the MT/MPO adapter comprises a flange plate, an MT port, and an MPO port, wherein the MT port and the MPO port are respectively located on two sides of the flange plate in a thickness direction, and the MPO port is configured to be connected to an MPO plug; and
   an MT plug, wherein the MT plug comprises an MT optical fiber and an MT clamp, wherein the MT optical fiber and the MT clamp are connected to one another, and the MT plug is connected to the MT port;
   wherein the flange plate is made of conductive plastic; and
   wherein at least a part of the MT clamp is made of conductive plastic.

2. The adapter assembly according to claim 1, wherein the MT port is made of conductive plastic.

3. The adapter assembly according to claim 1, wherein the MPO port is made of conductive plastic.

4. The adapter assembly according to claim 1, wherein a material of the conductive plastic comprises any one or more of the following materials:
   polyethersulfone, polyaniline, polyacetylene, or polyphenylene vinylene.

5. The adapter assembly according to claim 1, wherein the MT optical fiber comprises an optical fiber head and a pigtail, and the MT clamp comprises a holder and a guide rod,
   wherein a first end of the guide rod is fixedly connected to the holder, a second end of the guide rod is configured to be inserted into a guide hole of the optical fiber head from one end that is of the guide hole and that is closer to the pigtail and be exposed from one end that is of the guide hole and that is further away from the pigtail, and the first end and the second end of the guide rod are two opposite ends of the guide rod;
   wherein the holder has an accommodating part, wherein the accommodating part is configured to allow the pigtail of the MT optical fiber to pass through after the guide rod is inserted into the guide hole; and
   wherein the holder is made of conductive plastic.

6. The adapter assembly according to claim 5, wherein the accommodating part comprises a groove, and a maximum size of an opening of the groove for the pigtail to pass through is less than or equal to 3.5 millimeters.

7. The adapter assembly according to claim 6, wherein the accommodating part further comprises a cover that is detachably connected to the groove.

8. The adapter assembly according to claim 1, wherein the MT plug is detachably connected to the MT port.

9. The adapter assembly according to claim 1, wherein two ends of the flange plate in a length direction each have a first fixing hole, and the flange plate is configured to be installed on the hole of the panel through the first fixing hole.

10. The adapter assembly according to claim 1, wherein the panel has a locating hole, the flange plate has a guide pin, and the guide pin is configured to be inserted into the locating hole of the panel.

11. An optical communications device, comprising:
    a panel, wherein the panel has a hole; and
    an adapter assembly, wherein the adapter assembly comprises:
      a mechanical transmission (MT) to multi-fiber push on (MPO) adapter (MT/MPO adapter), wherein the MT/MPO adapter comprises a flange plate, an MT port, and an MPO port, wherein the MT port and the MPO port are respectively located on two sides of the flange plate in a thickness direction, and the MPO port is configured to be connected to an MPO plug; and
      an MT plug, wherein the MT plug comprises an MT optical fiber and an MT clamp, wherein the MT optical fiber and the MT clamp are connected to one another, and the MT plug is connected to the MT port:
    wherein the flange plate is made of conductive plastic;
    wherein the MT/MPO adapter in the adapter assembly is installed on the hole; and
    wherein at least a part of the MT clamp is made of conductive plastic.

12. The optical communications device according to claim 11, wherein the optical communications device further comprises:
    two mechanical parts, wherein the two mechanical parts are fixed to two sides of the hole of the panel in a length direction of the hole;
    wherein two ends of a flange plate are respectively fixed to the two mechanical parts to be installed on the hole of the panel.

13. The optical communications device according to claim 12, wherein the optical communications device further comprises a screw, and each mechanical part of the two mechanical parts has a second fixing hole;

wherein the two ends of the flange plate in a length direction each have a first fixing hole; and wherein each end of the two ends of the flange plate is fixed to a respective mechanical part of the two mechanical parts by using a screw that passes through the first fixing hole and the second fixing hole.

14. The optical communications device according to claim 13, wherein the mechanical part comprises a strip-shaped reinforcing rib.

15. The optical communications device according to claim 11, wherein the panel has a locating hole; and wherein the flange plate has a guide pin, and the guide pin is configured to be inserted into the locating hole of the panel.

16. The optical communications device according to claim 11, wherein the optical communications device further comprises:

a shielding gasket, wherein the shielding gasket is located between the MT/MPO adapter and the panel.

17. The optical communications device according to claim 16, wherein the shielding gasket is a flexible conductive gasket.

\* \* \* \* \*